United States Patent
Hamilton et al.

(10) Patent No.: US 7,076,351 B2
(45) Date of Patent: Jul. 11, 2006

(54) ENHANCED COMPUTER OPTIMIZED ADAPTIVE SUSPENSION SYSTEM AND METHOD

(75) Inventors: James M. Hamilton, Carlsbad, CA (US); Lonnie K. Woods, Jacumba, CA (US)

(73) Assignee: Great Northern Technologies, LLC, Chanhassen, MN (US)

( * ) Notice: Subject to any disclaimer, the term of this patent is extended or adjusted under 35 U.S.C. 154(b) by 0 days.

(21) Appl. No.: 10/205,205

(22) Filed: Jul. 24, 2002

(65) Prior Publication Data

US 2003/0001346 A1  Jan. 2, 2003

Related U.S. Application Data

(62) Division of application No. 09/439,109, filed on Nov. 11, 1999, now Pat. No. 6,502,837.
(60) Provisional application No. 60/107,999, filed on Nov. 11, 1998.

(51) Int. Cl.
  *B60K 16/00* (2006.01)
  *G06F 19/00* (2006.01)

(52) U.S. Cl. ............................. 701/37; 701/1; 703/8; 280/5.5; 267/2

(58) Field of Classification Search .................. 701/37, 701/36, 1, 38; 280/5.5, 5.514; 267/2, 136, 267/182; 703/8, 22
See application file for complete search history.

(56) References Cited

U.S. PATENT DOCUMENTS

| | | | |
|---|---|---|---|
| 3,035,853 A | 5/1962 | Klein | |
| 3,124,368 A | 3/1964 | Corley et al. | |
| 3,502,347 A | 3/1970 | Busignies | |

(Continued)

FOREIGN PATENT DOCUMENTS

| | | |
|---|---|---|
| DE | 28 48 286 | 5/1979 |
| GB | 1 485 003 | 9/1977 |
| GB | 1 591 689 | 6/1981 |
| GB | 1 604 416 | 12/1981 |
| GB | 2 120 355 A | 11/1983 |
| JP | 52-79438 | 7/1977 |
| JP | 57-201707 | 12/1982 |

OTHER PUBLICATIONS

Hamilton, "Computer–Optimized Adaptive Suspension Technology (COAST)," IEEE Transactions on Industrial Electronics, vol. 1E–32, No. 4, Nov. 1985, pp. 355–363.
Ford's 1984 Mark VII Offers Auto Touring Luxury, 2 pages.
Adler, "Mark VII Rivals Mercedes," On the Road, 2 pages.
Csere, "Technical Highlights," Car and Driver, p. 60.

(Continued)

*Primary Examiner*—Olga Hernandez
(74) *Attorney, Agent, or Firm*—Christie, Parker & Hale, LLP

(57) ABSTRACT

A system and method for controlling a damping system. The system has at least two dampers for damping between sprung and unsprung masses in the compression and rebound directions. Sensors generate signals based on position and other parameters of motion representative of the displacement between the sprung and unsprung masses. The process determines the appropriate compression and rebound forces to be applied at the wheels. A regulator responds to at least one of the independent compression and rebound control signals for adjusting, respectively, at least one of compression and rebound resisting forces of the dampers between the masses. Compliance for the dampers is emulated with software to produce the desired compliance forces. The distributed controller includes a processor that is responsive to signals representative of the position signals for forming the compression and rebound control signals for the regulator as a function of motion between the masses or a motion of a vehicle in which the dampers are located. The system has the capability of locking the suspension when parked.

21 Claims, 23 Drawing Sheets

U.S. PATENT DOCUMENTS

| | | | |
|---|---|---|---|
| 3,606,365 A | 9/1971 | Strong | |
| 3,608,925 A | 9/1971 | Murphy | |
| 3,807,678 A | 4/1974 | Karnopp et al. | |
| 3,830,138 A | 8/1974 | Joneleit | |
| 3,873,123 A | 3/1975 | Joneleit | |
| 3,881,736 A | 5/1975 | Wilfert | |
| 3,995,883 A | 12/1976 | Glaze | |
| 4,065,154 A | 12/1977 | Glaze | |
| 4,159,106 A * | 6/1979 | Nyman | 267/64.15 |
| 4,162,083 A | 7/1979 | Zabler et al. | |
| 4,215,403 A | 7/1980 | Pollard et al. | |
| 4,216,977 A | 8/1980 | Fujii | |
| 4,267,736 A | 5/1981 | Westbeck | |
| 4,333,668 A | 6/1982 | Hendrickson et al. | |
| 4,386,791 A | 6/1983 | Watanabe | |
| 4,391,452 A | 7/1983 | Ohmori | |
| 4,396,202 A | 8/1983 | Kami et al. | |
| 4,398,704 A | 8/1983 | Buchanan, Jr. et al. | |
| 4,402,527 A | 9/1983 | Kakehi et al. | |
| 4,433,743 A | 2/1984 | Ohmori et al. | |
| 4,433,849 A | 2/1984 | Ohmori | |
| 4,449,733 A | 5/1984 | Iida et al. | |
| 4,453,725 A | 6/1984 | Kuwana et al. | |
| 4,456,084 A | 6/1984 | Miller | |
| 4,463,428 A | 7/1984 | Gilliam | |
| 4,466,625 A | 8/1984 | Kondo et al. | |
| 4,468,739 A | 8/1984 | Woods et al. | |
| 4,474,063 A | 10/1984 | Krueger | |
| 4,568,096 A | 2/1986 | Yew et al. | |
| 4,634,142 A | 1/1987 | Woods et al. | |
| 4,661,716 A * | 4/1987 | Chu | 290/53 |
| 4,677,263 A | 6/1987 | Hamilton et al. | |
| 4,720,085 A | 1/1988 | Shinbori et al. | |
| 4,722,548 A * | 2/1988 | Hamilton et al. | 267/64.15 |
| 4,729,459 A | 3/1988 | Inagaki et al. | |
| 4,838,574 A * | 6/1989 | Baraszu | 280/5.515 |
| 4,916,632 A | 4/1990 | Doi et al. | |
| 5,062,657 A * | 11/1991 | Majeed | 280/5.503 |
| 5,097,419 A | 3/1992 | Lizell | |
| 5,127,667 A | 7/1992 | Okuda et al. | |
| 5,144,559 A | 9/1992 | Kamimura et al. | |
| 5,152,547 A * | 10/1992 | Davis | 280/5.512 |
| 5,154,442 A * | 10/1992 | Milliken | 280/5.507 |
| 5,168,448 A | 12/1992 | Matsumoto et al. | |
| 5,174,598 A | 12/1992 | Sato et al. | |
| 5,203,584 A | 4/1993 | Butsuen et al. | |
| 5,208,749 A | 5/1993 | Adachi et al. | |
| 5,235,529 A | 8/1993 | Hanson et al. | |
| 5,255,191 A | 10/1993 | Fulks | |
| 5,289,380 A | 2/1994 | Kimura | |
| 5,295,074 A | 3/1994 | Williams | |
| 5,295,705 A | 3/1994 | Butsuen et al. | |
| 5,321,616 A | 6/1994 | Okuda et al. | |
| 5,322,320 A | 6/1994 | Sahashi et al. | |
| 5,337,864 A | 8/1994 | Sjöström | |
| 5,365,432 A * | 11/1994 | Kakizaki et al. | 701/37 |
| 5,416,701 A | 5/1995 | Kawabata | |
| 5,491,633 A * | 2/1996 | Henry et al. | 701/36 |
| 5,529,152 A | 6/1996 | Hamilton et al. | |
| 5,559,700 A * | 9/1996 | Majeed et al. | 701/36 |
| 5,735,372 A | 4/1998 | Hamilton et al. | |
| 5,794,168 A * | 8/1998 | Sasaki et al. | 701/37 |
| 5,832,398 A * | 11/1998 | Sasaki et al. | 701/37 |
| 5,928,297 A | 7/1999 | Murata et al. | |
| 6,244,398 B1 * | 6/2001 | Girvin et al. | 188/316 |
| 6,366,841 B1 * | 4/2002 | Ohsaku | 701/37 |
| 6,464,048 B1 * | 10/2002 | Groves et al. | 188/266.6 |
| 6,502,837 B1 * | 1/2003 | Hamilton et al. | 280/5.515 |

OTHER PUBLICATIONS

Baker, "High-Tech Developments Keep Faith with Legacy of Innovation," 3-84 Ward's Auto World, pp. 64-65.

"1984 Parts Report Shocks/Struts," Automotive Marketing, Apr. 1984, 2 pages.

Assenza, "1984 Lincoln Continental Mark VII LSC," Motor Trend, Aug. 1983, pp. 27-32.

Csere, "Mitsubishi Galant," Road Test, Car and Driver, Oct. 1984, pp. 73, 76, 77 and 79.

Crosby & Karnopp, "The Active Damper—A New Concept For Shock and Vibration Control," The Shock and Vibration Bulletin, The Shock and Vibration Information Center, Navel Research Laboratory, Washington, D.C., Bulletin 43, Jun., 1973, pp. 118-133.

Tomizuka, "Optimum Linear Preview Control With Application to Vehicle Suspension—Revisited," Journal of Dynamic Systems, Measurement, and Control, Sep. 1976, pp. 309-315.

Krasnicki, "Comparison of Analytical and Experimental Results for a Semi-Active Vibration Isolator," The Shock and Vibration Information Center, Navel Research Laboratory, Washington, D.C., Bulletin 50, Sep., 1980, pp. 69-76.

Krasnicki, "The Experimental Performance of an 'On-Off' Active Damper," The Shock and Vibration Information Center, Navel Research Laboratory, Washington, D.C., Bulletin 51, May, 1981, pp. 125-131.

Margolis, "Semi-Active Suspensions for Military Ground Vehicles Under Off-Road Conditions," University of California, Davis, Sep., 1981, 19 pages.

Cheok, et al., "Optimal Suspension Design with Microcomputerized Parameter Optimizing Damping," IEEE, Oct. 25-26, 1984, pp. 111-118.

"Monroe High Performance Shock Absorber Fundamentals," The Suspension System, 6 pages.

* cited by examiner

ENHANCED COMPUTER OPTIMIZED ADAPTIVE SUSPENSION SYSTEM AND METHOD

CROSS-REFERENCE TO RELATED APPLICATION

This application is a Divisional application of patent application Ser. No. 09/439,109 filed Nov. 11, 1999 now U.S. Pat. No. 6,502,837, which claims the benefit of U.S. Provisional Patent Application No. 60/107,999 filed Nov. 11, 1998, the disclosures of which are incorporated herein by reference.

BACKGROUND OF THE INVENTION

The present invention relates to computer controlled vehicle suspension systems and methods, and more particularly to vehicle suspension systems and methods in which computer controlled damping forces in compression and rebound directions are used to optimize ride and handling characteristics of the vehicle.

A typical suspension system interlinks wheels and axles of the vehicle with the body and chassis of the vehicle. The suspension system generally includes springs and damping devices. The spring compress and expand to minimize movement of the chassis and body when the wheels encounter perturbation in a roadway surface. Excess movement created by the springs is controlled by the damping devices.

A common damping device, or damper, is a velocity sensitive hydraulic system which uses hydraulic pressure to resist movement of a piston. Piston velocity is a direct function of the speed of the sprung mass with respect to the unsprung mass. As the damper is a velocity sensitive device, the greater the piston velocity, the greater the damping force provided by the damper in a direction opposite the movement of the piston.

The damping force is generally created when the moving piston forces a hydraulic fluid, typically oil, through an orifice or a valve. A flow resistance encountered by the oil results in a set of damping forces, a compression force and a rebound force. The damping forces act to counter and dissipate a stored energy associated with a springs movement that generates a spring-induced force. Varying the fluid flow through the valve or orifice varies the force acting against the spring-induced forces and, therefore, changes the ride and handling characteristics of the vehicle.

The damping forces are passive resistive forces. Accordingly, the respective compression and rebound forces only have effect when the piston is moving. When the velocity of the piston is zero no force is applied.

To improve ride and handling, one type of control system used in suspensions is a constant force type suspension system. Details of a constant force type suspension system are discussed in PCT Application entitled *Computer Optimized Adaptive Suspension System and Method Improvements* published Feb. 29, 1996, international publication number WO 96/05975 the entirety of the disclosure of which is incorporated herein by reference. In a constant force type suspension system pressures in the compression and rebound chambers of a damper are controlled by one or more pressure regulators to control a compression force and a rebound force. A computer utilizes a control input as a feedback signal to generate a constant compression and/or rebound force at a wheel.

If a vehicle equipped with such a constant force suspension hits a sharp bump the pressure is increased in a compression chamber of the damper. To maintain a constant force the control system allows for a pressure release of the hydraulic fluid from the compression chamber to maintain a constant force. This is done by providing a pressure relief valve on the regulator so that once a preset pressure is reached in the fluid, the valve opens to allow the hydraulic fluid to flow out of the chamber relieving the pressure. However, while a compression force is being applied and regulated it is not possible to regulate force in the rebound direction. Thus, only one chamber at a time is being pressurized, due to the piston movement.

A problem with this design is that there is a lack of force when the direction of travel of the damper is wrong for the application of a control force. For example, if during braking a bump is hit an upward force is exerted on the damper. After the wheel's carrier assembly compresses to the maximum extent possible in one direction, it begins to rebound. During rebound the compression forces cannot be maintained and can only be reestablished once the wheel reaches its lowest position and begins to compress again. This is because the direction of travel has changed, and forces applied to control movement in a direction opposite to the movement are ineffective. Thus, control forces can be momentarily lost during damper movements in an undesired direction when attempting to maintain a constant force. This loss of force is not as serious as what happens when the direction of movement one again engages the control valve and the previously preset pressure returns very abruptly, which results in severe harshness. Mechanical compliance is a way of maintaining control forces during damper movement in an undesired direction.

FIG. 1 is a cross sectional view of a damper provided with mechanical compliance. Compliance is the ability of an object to yield elastically when a force is applied. In suspension systems compliance is provided by springs or rubber bushings in the damper. Compliance provides transitional forces during a period of time in which damper forces would otherwise be lost.

As shown in FIG. 1 compliance provided by a set of springs or a set of elastic rubber bushings has been incorporated in damper designs. A piston 102a is coupled to a damper shaft 104a. Resilient rings 106a and 108a are springs or rubber bushings that are disposed above and below the piston, such that they elastically couple the shaft and piston. A bolt 110a and a washer 112a retain an upper resilient ring 106a to a damper shaft 104a. A lower washer 114a rests on a shoulder machined into the damper shaft 104a to retain a lower resilient ring 108a. The rubber bushings 106a, 108a compress when pushed upon.

Thus, when the damper shaft is forced upward hydraulic oil in compression chamber 116a pushes against the piston. Because the piston is not fixed to the shaft the rubber bushings or springs 108a are compressed. Accordingly, the movement of the damper shaft does not produce a corresponding equal movement of the piston. The oil in the compression chamber is in contact with the oil in an outer sleeve 118a through a port 120a. The outer sleeve is in contact with pressure regulator 122u through port 120a. Therefore, when the pressure in the compression chamber reaches a relief setting, pressure regulator 122a opens, allowing the fluid in the compression chamber to flow out of the chamber, maintaining a predetermined force on the fluid. Thus, the compliance provided by the resilient rings or springs 106a, 108a, allows the damper shaft to move upward before the preset relief setting of pressure regulator 122a has been reached. Therefore, instantaneous changes of piston position with respect for the chamber are allowed for.

In addition in some applications a loaded vehicle's suspension becomes mushy. The ratio of a DFT of the SNF to one half of the SNF tracks the load change in producing compensating forces. In some SNF applications there was too little damping for small bumps and too much on big bumps. Taking the square root of the DFT SNF damping output provides optimum damping for all bumps. In providing UNF forces a steep force causes a mechanical strain on the system hardware. By taking the square root of the UNF damping force this is eliminated. In the bottoming out and toping out force generation sufficient control was not obtained. By taking position as a displacement and the velocity as an axle speed the responses now provide sufficient control.

After the springs become fully compressed as a result of the force applied from hitting the bump, the springs rebound in the opposite direction. Thus, the wheel and carrier move away from the chassis once the compressive force is removed. The lower rubber bushing 106a provides compliance in the rebound direction in a manner analogous to the discussion above The compliance provided by the mechanical system does not require the relief valves in the pressure regulators 122a and 124a to activate quickly when presented with short, abrupt motions. Further, compliance reduces high frequency vibrations and harshness encountered when the vehicle hits a bump by allowing the piston and chamber to move relative to each other, without, any delay due to control of the valves. As such, a suspension control system is desirable that is not subject to the problems of orifice controlled valves, and which incorporates valves that are not susceptible to the adjustment limitations and instabilities of current control valves. Thus, less expensive valves that tend to activate slowly may be used. However, the use of mechanical parts to provide compliance increases the number of parts required for fabrication and assembly.

SUMMARY OF THE INVENTION

The present invention accordingly provides a real-time computer control system for controlling one or more suspension control units (comprising damping devices) in a vehicle suspension system. The suspension control units control movement between sprung and unsprung masses in both compression and rebound directions with a process that uses constant force valves, replacing mechanical compliance with emulated compliance. Load compensation is provided to dynamically adjust ride and handling characteristics for changing load conditions. To achieve this the control system computes a signal for controlling each suspension control unit from position signals indicating the relative position (displacement) of the sprung and unsprung masses as related by the extension of the suspension control unit. Based upon the position signals (and other signals such as vehicle speed, acceleration, etc.), the control system interactively determines desired control forces to ensure optimum ride and handling characteristics. The ride handling characteristics affected are described by a set of parameters of motion (such as roll, pitch, body motions, etc.), emulated compliance, and load compensation. Processing of the set of parameters results in generation of a desired compression force and a desired rebound force.

The desired compression and rebound control forces for this set of parameters are determined, in part, by determining the amplitude of motion at the natural frequency of the sprung and unsprung mass systems. The natural frequency is isolated using an appropriate filter. Proportional damping forces in the direction opposite to the displacement of the spring from its normal or equilibrium position are determined and applied. A constant force is approximately maintained on the vehicle (emulating a constant force spring), thus minimizing body motions.

The process utilized to calculate the control forces utilizes the calculation methods described above to first provide preconditioning steps followed by an independent calculation of the parameters of motion. The resulting individual compression and rebound forces for each of the parameters of motion are summed to provide a resultant force in the compression and rebound directions to simultaneously control all of them.

In an embodiment the suspension control unit comprises a fluid control unit and a vehicle actuator. The fluid control unit is coupled to an actuator of a vehicle. Specifically, each actuator of a vehicle has a fluid control unit coupled to it.

In forming a suspension control unit, each fluid control unit may be maintained separate from its corresponding actuator or may be integrated with its corresponding actuator into a single package.

Each fluid control unit comprises a reservoir which receives fluid displaced by the movement of the rod (and piston) in and out of the actuator. A position sensor and preferably a Linear Variable Inductive Transformer ("LVIT") position sensor is fitted within the reservoir to sense the volume of fluid within the reservoir. A microprocessor is coupled to the reservoir and receives signals from the position sensor for ascertaining the position of the actuator at any given time. An optional temperature sensor is also coupled to the reservoir for sensing the temperature of the fluid within the reservoir. The temperature sensor provides the microprocessor with the fluid temperature information so as to allow the microprocessor to ascertain the absolute position of the actuator by accounting for changes in the fluid volume due to temperature changes. Depending on the position of the actuator (and various other vehicle inputs), the microprocessor controls a pair of valves mounted on the reservoir for controlling the pressure of fluid entering or leaving the fluid control unit reservoir and thereby, controlling the pressure of the fluid entering or leaving the actuator and thus, controlling the damping provided by such actuator.

Each valve mounted on the reservoir comprises an annular body having a side passage and an end opening in communication with a passage on the reservoir, and a poppet slideably fitted within the body. The poppet can slide between a first seated position blocking the end opening of the valve body and a second retracted position not blocking the end opening. The poppet is moved into position blocking the end opening by a solenoid. A spring is used to slide the poppet back to a position not blocking the end opening when the solenoid is deactivated.

The poppet comprises a conical section and a cylindrical section extending from the larger diameter portion of the conical section. The conical section defines a tip portion of the poppet which is used to block the end opening of the valve body. The diameter of the largest diameter portion of the conical section is smaller than diameter of the cylindrical section. Consequently, an annular shoulder is formed extending radially around the poppet between the conical and cylindrical sections.

The conical tip section of the poppet is not exposed to the side passage when the poppet is in the seated position. As a result, the fluid pressure through the side passage is reacted against the poppet annular shoulder which is always exposed to the side passage whether the poppet is seated in the valve body or retracted from its seated position. Consequently, the fluid provides a force against the poppet annular shoulder tending to retract the poppet. A solenoid is incorporated that provides a variable force that tries to keep the valve seated in the closed position blocking the end opening of the valve body. As a result, the force set by the solenoid determines the pressure required to open the valve. Hence, the solenoid allows the valve to become an adjustable pressure regulator.

Since the area of the poppet annular shoulder exposed to the fluid pressure remains constant throughout the poppet stroke from a seated to a completely retracted position, the force generated by a given fluid pressure against the annular shoulder is constant tending to provide for a constant pressure regulation at different fluid flow rates. In other words, as the flow rate is increased, thereby increasing the fluid pressure, a larger force is reacted against the annular shoulder tending to retract the poppet further thereby canceling out the pressure created by the increased in fluid flow, thus, alleviating the instability problems associated with current valves incorporating poppets.

Moreover, applicant has discovered that a conical surface which is a section of a 70° cone, i.e., a conical surface whose surfaces are tapered at 55° relative to a plane perpendicular to the conical surfaces central axis, works optimally. This is because as the pressure on the poppet annular shoulder starts to open the valve, the fluid flow causes dynamic forces on the conical surface which would tend to close the valve (i.e., seat the poppet). However, as the poppet is retracted, the fluid pressure is reacted on a portion of the conical surface generating a retracting force as well as lateral force on the poppet. Applicant discovered that with the 55° angle, the retracting force on the conical surface tends to cancel the dynamic flow force. This results in a constant pressure drop over wide ranges of fluid flow (e.g. 0 to over 50 gallons per minute).

The movement of the poppet is stopped when a flange extending from the poppet engages an inner annular shoulder formed on the valve body. As a result, the valve body is not loaded by the tip of the poppet as with conventional poppet valves alleviating the need to use expensive hardened steel as is used in the valve body of a conventional poppet valve for enduring the pounding by the poppet tip.

A spring biased check valve is slideably fitted around the body of each valve body to allow for flow out of the reservoir. When flow is tending to retract the poppet from its seated position, the check valve is closed and the valve regulates the fluid pressure. When the direction of flow reverses (i.e., the other valve is allowing flow to enter the reservoir) the check valve opens to allow the fluid to be bypassed back to the actuator. As the actuator pushes fluid back and forth through the fluid control unit reservoir, the pressures are correspondingly controlled in each direction as the fluid flows through one controlling valve and bypasses the other.

The fluid control unit and specifically the control valves of the present invention provide for a smooth metering of fluid to and from the actuators without the need for the large and expensive accumulators. Moreover, the fluid control unit of the present invention has a LVIT position sensor integrated into the reservoir. Furthermore, the valves of the present invention provide for better operational stability, are smaller and less costly, have longer fatigue lives and incorporate an optimum conical tip angle for providing a flat pressure response over different flow rates.

DESCRIPTION OF THE DRAWINGS

These and other features and advantages of the present invention will be better understood from the following detailed description read in light of the accompanying drawings, wherein.

DETAILED DESCRIPTION OF THE INVENTION

Figure 2:
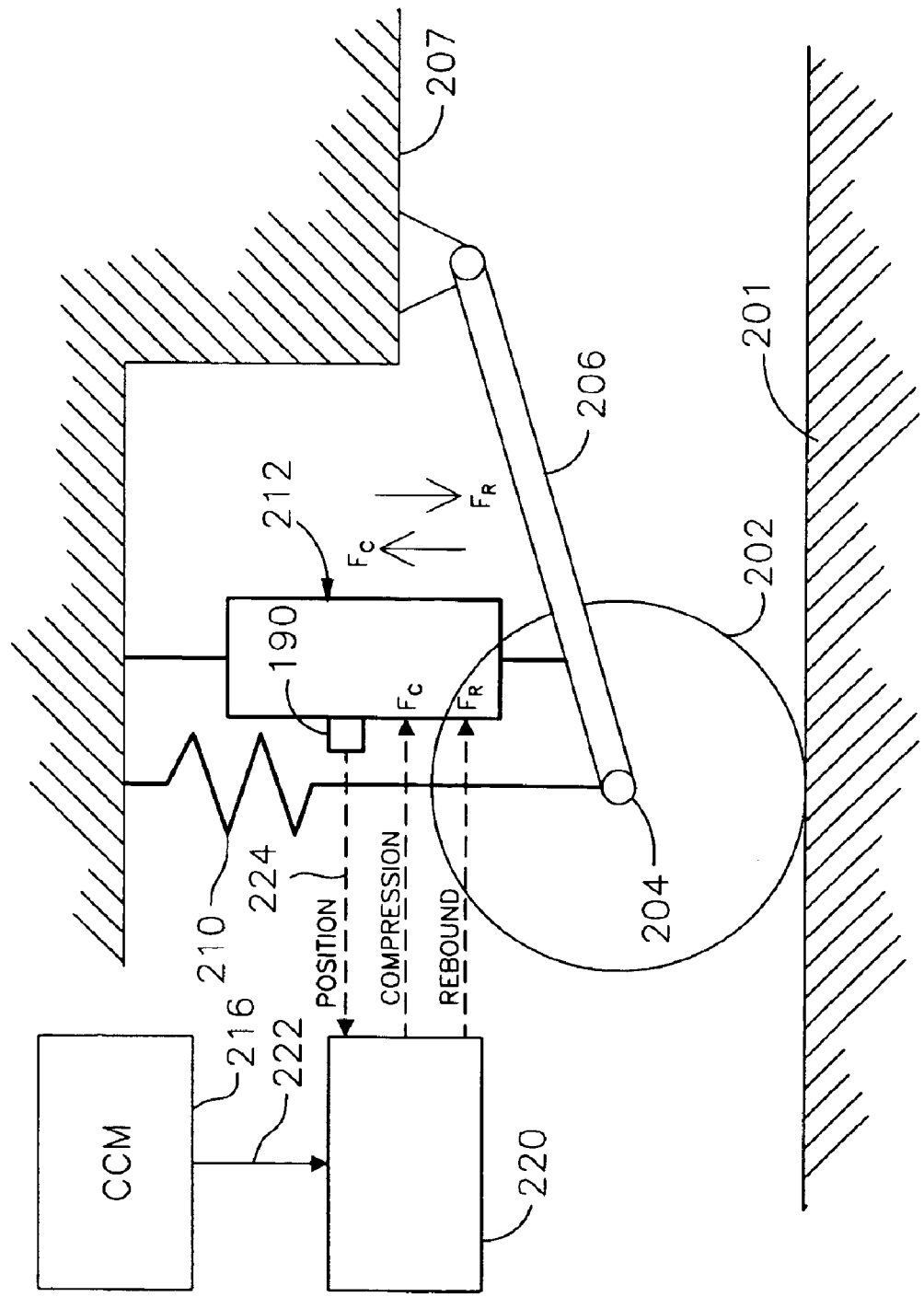
FIG. 2 illustrates a suspension system controlled by an embodiment of the present invention.

FIG. 2 illustrates one representative wheel 202 of a plurality of wheels in a suspension system in accordance with an embodiment of the present invention. The wheel rotates on an axle 204. The axle is attached to one end of a carrier 206. The other end of the carrier is pivotally mounted to a vehicle frame or chassis 207. It is understood that a variety of wheel mounting configurations may be used. A suspension control unit 212 and a spring 210 are connected between the chassis and axle.

The wheel, axle, and carrier comprise an unsprung mass, and the frame 207 comprises a sprung mass. During operation of the vehicle the wheel will often encounter irregularities in a road surface. For example, the wheel may encounter a bump in the road, with the result that the wheel is forced towards the chassis.

The wheel can move towards the chassis (compression) or away from the chassis (rebound). To change the characteristics of the ride, compression and rebound control forces $F_C$ and $F_R$ are controlled during each direction of travel by the suspension control unit. The force $F_C$ is a force in the compression direction, and the force $F_R$ is in the rebound direction. The forces $F_C$ and $F_R$ are used to counteract forces present during compression and rebound, respectively. The forces $F_C$ and $F_R$, are calculated to counteract forces produced by road conditions, such as the previously mentioned bump, so that the motion of the chassis tends to remain within a precalculated range.

To calculate signals to control forces $F_C$ and $F_R$ a sensor system comprising wheel position sensor 190 produces a wheel position signal 224 indicative of wheel position and direction of travel. The wheel position signal is sent to a remote electronics module ("REM") 220 that is a subassembly of the SCU 212. The REM, in conjunction with a coupled 222 central control module ("CCM"), 216 calculates the control signals to control forces $F_C$ and $F_R$.

In order to apply the proper forces to the wheels the CCM 216 supplies additional signals 222 and to each wheel. Since the damper is responding to road conditions all the wheels and chassis are experiencing, the control signals comprise sensor inputs such as roll and pitch accelerations and vehicle speed as well as wheel position data. For example, other factors that influence the ride are also taken into consideration. Other wheels and motion of the chassis also affect vehicle handling and are proportionally summed by the controller in determining the forces $F_C$ and $F_R$.

In the embodiments of the invention, determination of the forces $F_C$ and $F_R$ to be applied is accomplished by implementing an overall process (as will be described in FIG. 3) by hardware interconnected as will be described in FIG. 4. Characteristics of the hardware are described with respect to FIGS. 5 and 6. The details of the process implemented are described with respect to FIGS. 11–22.

Figure 3:
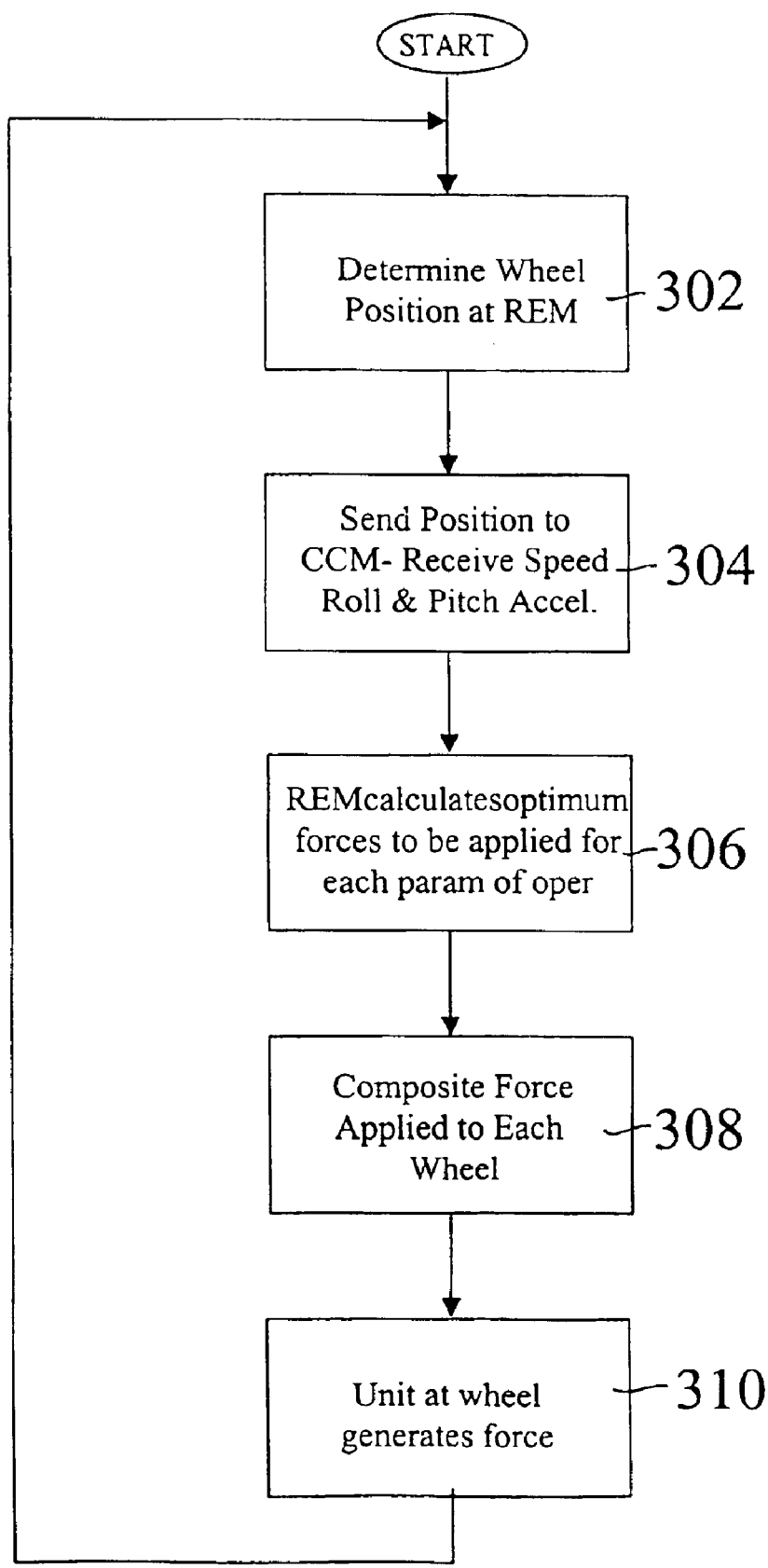
FIG. 3 is a flow diagram showing steps of a process for generating forces in the compression and rebound direction.

FIG. 3 is a flow diagram showing the steps of a process for generating forces in either the compression or rebound direction. In step 302 a wheel's position is determined at the remote electronics module (REM). In step 304 the wheel's position is sent to a central control module (CCM), which returns to the REM other input signals comprising a speed input and acceleration inputs indicative of cornering and braking conditions (referred to herein as Roll & Pitch accelerometers, respectively). As an alternative, a steering angle sensor and brake sensor can replace the Roll & Pitch accelerometers, respectively. In an embodiment of the invention the position is determined 400 times a second for each wheel. In one embodiment of the invention, wheel position is determined within a few hundredths of an inch. Each wheel incorporates a wheel controller that communicates with a central computer, to transmit data such as wheel position, speed and accelerations 304. A signal is sent over a bus conforming to the requirements of a SAE Controller Area Network (CAN) standard. The bus provides a uniformly accepted protocol for transmitting signals. However, any bus structure or wiring harness capable of communicating the signals is sufficient.

After exchanging the data for each wheel, the central controller and the wheel with controller determine a control response for each of seven independent parameters of motion to be applied at each wheel 306. The seven independent parameters of motion are: roll, pitch, sprung natural frequency (SNF), unsprung natural frequency (UNF), bottoming out (BO), topping out (TO), and pumping down (PD). The response modes are described in the following paragraphs.

Roll and pitch refer to rotational body movement about respective longitudinal and transverse axes of the vehicle. Roll and pitch are generally due to respectively lateral (transverse) and longitudinal accelerations caused by turning (roll) and braking or hard accelerating (pitch). Braking tends to force down the front of the vehicle while raising the rear of the vehicle. Accelerating causes the opposite to occur. Turning causes similar movements, but with respect to the left and right sides of the vehicle (a left turn compresses the suspension on the right side and extends it on the left side and a right turn causes the opposite).

Accelerometers present indicate whether roll or pitch are being induced. Counteracting forces are then provided by the suspension control units (SCU) to attempt to prevent corresponding roll or pitch motions. To perform the process the positions of the extensible members about the transverse and longitudinal body axes are compared in addition to the accelerometer signals to determine the desired compression and rebound damping forces.

The sprung natural frequency (SNF) is the frequency at which the sprung mass (the frame and body) tends to oscillate on the springs. This can be determined empirically for a particular vehicle, but for a typical car or light truck it is on the order of a 1.0 Hz. It is desirable to control and limit motion on the SNF. When frame and body motion are detected a response is calculated that will produce forces to eliminate the motion. The oscillation of the sprung mass is determined from wheel position measured over a period of time. Once the oscillations are characterized a series of calculations are made based on the acquired data. The SNF response calculations determine the control forces in the compression and rebound directions which will damp the vehicle motion due to the spring oscillation.

The unsprung natural frequency (UNF) is the frequency at which the unsprung mass (the wheels, axles and carriers) tends to oscillate on the springs. Motion of the unsprung mass is generated by contact with a succession of road irregularities, such as bumps. If the motion of the unsprung mass is not controlled, it will be transferred to the sprung mass. As with the SNF, the UNF frequency can be determined empirically. For a typical car or light truck is on the order of a 10 Hz. A set of UNF response calculations, based on the wheel oscillation frequency, determine the damping forces in the compression and rebound directions to control wheel motion. This is done, in part, by determining the amplitude of body to wheel motion, as determined from the wheel position as it oscillates at the unsprung natural frequency, and providing a counter force to control the wheel motion that is partly proportional to the velocity of the unsprung mass relative to the sprung mass.

Bottoming out (BO) occurs when a road perturbation, such as a bump or other influence, causes the wheel and axle to reach the upper limit of travel of the suspension. In this state the spring is compressed to its maximum limit.

Topping out (TO) refers to the condition where a road perturbation, such as a hole or other influence, causes the wheel and axle to reach the lower limit of travel of the suspension system. Bottoming and topping out (BTO) response calculations determine the damping forces required to avoid the occurrence of the previously mentioned situations. This is partially accomplished by using the current position of the extensible member, the rate of change and the remaining travel from that position to determine the desired compression and rebound forces to avoid bottoming or topping out.

Pumping down (PD) occurs when the compression forces during rapid wheel movements are less than the rebound forces. Over an interval of time the net or total resulting force on the chassis or body is predominantly downward, pulling the chassis lower to the ground. Simply put, when the rebound force exceeds the compression force of the damper, the rebound force hinders the return of the springs from a compressed state upon oscillation of the vehicle and thus decreasing the average extension of the damper during the oscillation. A pumping down response calculation determine when the chassis is being pulled downward and decreases the rebound resisting force to counteract the pumping down effect caused by otherwise excessive rebound forces resisting return of the compressed spring.

The control process for generating either compression or rebound forces of FIG. 3 calculates the response for each of the seven parameters discussed above and sums them together. Under the principle of superposition of forces an overall response force is determined. Depending on the application, the seven parameters may be weighted in different way. For example the handling performance of a sports car suspension or the luxury ride performance of a sedan can be reproduced by adding the responses of each of the seven parameters. Based on the overall response force, a composite response signal is produced. The composite response signal is subsequently modified to provide for load compensation and to emulate compliance forces. The composite response signal is routed to the appropriate wheel's SCU where it is applied to the regulator to control the compression and rebound forces.

Continuing with FIG. 3, the composite response signal is communicated to each wheel 308, where a suspension control unit applies a compression or rebound force 310 to each wheel. As forces on the wheels are constantly changing in response to road conditions and steering, the parameters of motion are continuously evaluated and updated to produce a desired ride.

Figure 4:
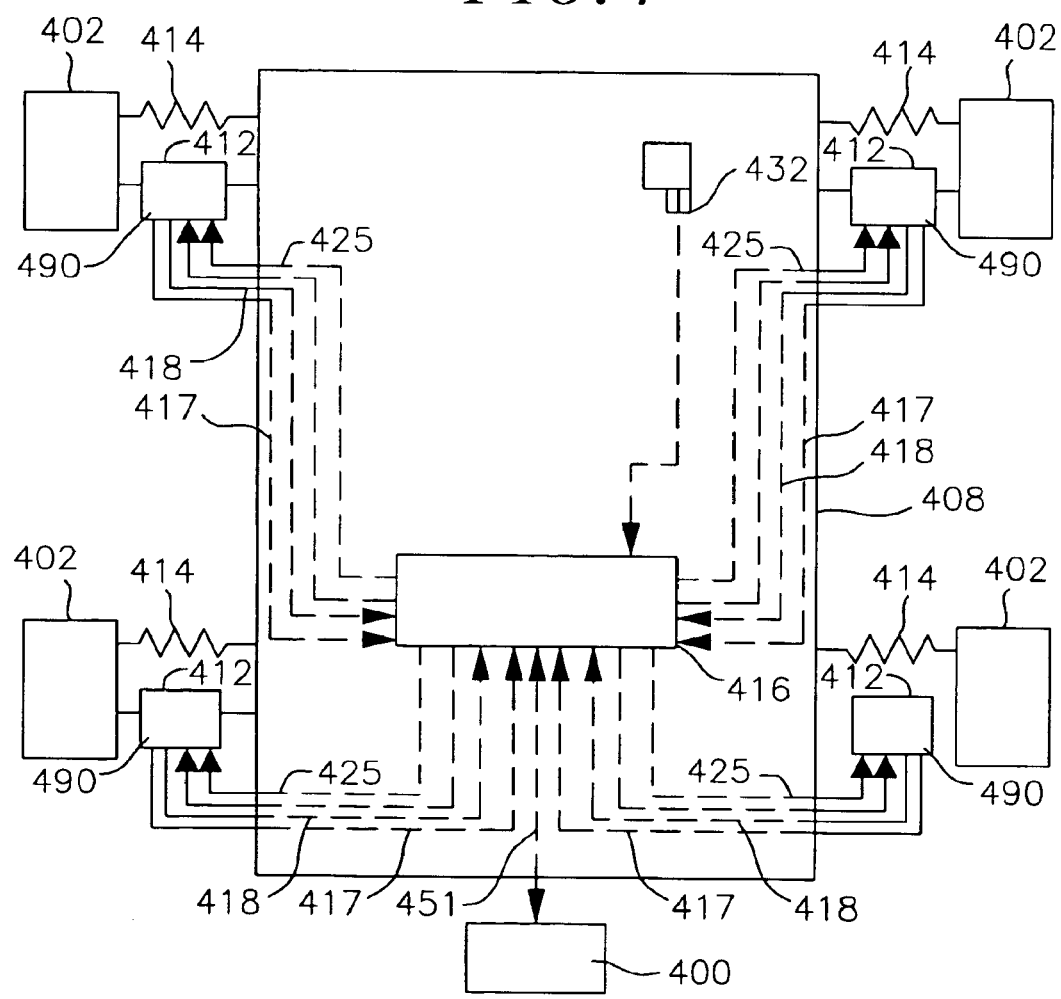
FIG. 4 is a system block diagram of an embodiment of the invention showing signal flow.

FIG. 4 is a systems block diagram of an embodiment of the invention showing signal flow. The embodiment controls a suspension system having four wheels. In alternative embodiments up to six wheels are controlled. The vehicle 408 is shown comprising four wheels, left and right front and left and right rear, 402, suspended from the vehicle by suspension control units (SCU's) 412 and springs 414 as described above.

The embodiment of FIG. 4 utilizes a central control module (CCM) 416 in communication with wheel controllers which are in turn contained in remote electronics modules (REMs) 490 that are part of the SCU's 412. These communications include controller area network (CAN) signals 425, power for the REMs 417 and miscellaneous other signals 418 such as the ignition signal used to properly power the controller on and off. High current control signals to actuate the valves are generated in the REM by the wheel controller based in part on the digital signals transmitted over the CAN bus from the CCM. The high current control signal is generated according to the process of FIG. 3 in response to previously processed signals indicative of wheel position and other input signals (302 and 304 of FIG. 3).

Absolute wheel position is determined by determining a relative wheel position and adding a correction factor based upon temperature. Relative wheel position signals are generated by a linear variable inductive transformer ("LVIT") position sensor housed in the REM 490. The relative wheel position signals are transmitted from the REMs over the CAN 425 to the CCM 412 as well as the other REMs. The relative wheel position is determined by measuring a hydraulic fluid level present in the SCU with the LVIT. The SCU is filled with a hydraulic fluid that expands and contracts over a range of temperatures experienced by the SCU.

To determine the absolute wheel position the correction factor based on a temperature of the hydraulic fluid is processed and subsequently combined with the wheel position data from the LVIT. The temperature of the hydraulic fluid is sensed and the REM wheel controller determines absolute wheel position. The wheel controller do this by processing relative wheel position corrected by a factor that takes into account hydraulic fluid expansion at the temperature.

Other signals between the CCM and wheel controllers are transmitted over the CAN bus. The other signals include roll acceleration, pitch acceleration and speed, all be sent from the CCM to each of the REMs. The signals are supplied by roll accelerometer 430, pitch accelerometer 428 and speed 432 sensors respectively. The signals are transmitted to the CCM via the CAN Bus 425. The REM wheel controller, working in concert with the appropriate signals, derives from this data desired damping forces in the compression and rebound directions applied by the suspension control units at each wheel.

Additional CCM connections are available for alternative embodiments that utilize air spring control methods more fully disclosed in co-pending patent application "Enhanced Computer Optimized Adaptive Air Spring Suspension", filed Nov. 11, 1999 U.S. patent application Ser. No. 09/439,106. The additional CCM connections comprise control signals to one or more air valve solenoids and a signal from a pressure sensor. In this embodiment a suspension spring's performance is modified by controlling air pressure with valves. The air pressure controlled by air valve solenoids is adjusted through an output port to release pressure, and a pump port to increase pressure. Addition or removal of air is determined based on data from the pressure sensor and the wheel position sensors.

The CCM module also communicates with the suspension control units (SCUs) 412, which are a modular assembly. The SCUs provide an interface to convert electrical control signals, determined by a process of the invention, to mechanical forces $F_C$ and $F_R$ that control the suspension system.

The SCUs comprise actuators, a reservoir, valve assemblies and REMs. The actuator comprises a pressure tube, rod, piston, seals and hydraulic fluid. The reservoir contains hydraulic fluid that circulates through pressure regulators under the control of an embodiment of the invention to control the forces $F_C$ and $F_R$ through regulating the fluid pressure. Pressure on the oil is regulated on compression and rebound by solenoid controlled valves contained in the pressure regulator assembly. The regulator assembly comprises solenoid controlled valves with a poppet valve design tending to have an improved response time. An aspect of an embodiment of the process of the invention used to control the poppet valve provides emulated compliance.

Suspension control units (SCU) 412 couple each wheel, 402 respectively, to the body of the vehicle. The controller 416 receives position data via CAN bus lines 425 from position sensors in the remote electronics modules 490. The position sensors indicate the position of an extensible member, or rod, that is a part of each suspension control unit.

Analog to digital (A/D) and digital-to-analog (D/A) converters are used to interface the analog sensors to the digital computer. A/D and D/A conversion is performed in the remote electronics module (REM) 490 and the CCM 416. Other sensors indicating wheel to body displacement, acceleration and other equivalent data are used in conjunction with the A/D converters.

An optional control panel 400 in communication with the CCM via CCM path 451 is provided for the vehicle operator to adjust a control signal level. The panel provides a potentiometer for adjusting a desired "speed mod" level for SNF and Roll/Pitch. In an embodiment an additional potentiometer is provided as a "motion gain control" An adjustable resistance range of the potentiometer provides an adjustment between a soft and a firm ride. The potentiometer is inserted in series with a signal line such that by adjusting it, the operator reduces the SNF and the roll/pitch control levels.

In one embodiment the control panel indicates a failure in the suspension system by an indicator lamp (or in an alternate embodiment an LED) that is green when operating normally and flashing red/green with a code to identify a failure and its source. Failures identified comprise sensor failures and control module failures. Failures are detected by interrogating a component over the CAN bus.

The embodiment of FIG. 4 utilizes a microprocessor as a central control module (CCM) 416 to coordinate computation in conjunction with processors in each REM. The CCM controls the air suspension subsystem functions, interface with the accelerometers, the speed sensor and the control and monitoring panel directly. At each wheel a microprocessor based remote electronics module (REM)490 performs the damping subsystem control functions. In this embodiment the complete cycle time for performing a calculation is 2.5 ms for processes requiring the fastest computation, and 5 ms for all other processes. The timings presented are exemplary, with a variety of timing mechanisms and periods possible.

Processing of the control signals collected by the suspension system is distributed between the CCM and wheel controllers. The CCM and the REM wheel controllers use the control processes to generate control signals at each suspension control unit. An exemplary distribution of the computational workload to implement the process of the invention is listed in Table 1a and b.

TABLE 1a

| CCM Workload | REM Workload |
|---|---|
| User interface to switches/indicators | Process for ideal ride control |
| Relaying Sensor Data, Mode & Status to REMs | Provide P, T & Status to the other REMS |
| Relaying Ignition to REMs | Provide P_ABS to the CCM for Load Leveling |
| Process Leveling Algorithms, if applicable | Provide SPEED to the REMs (if the REM has the sensor) |
| Perform diagnostics on its sensors | Perform diagnostics on its sensors/solenoids |
| Provide error/failure codes | |
| Diagnostics window to PC for ride tuning | |
| Downloading software | |

TABLE 1b

ALGORITHMS SPLIT

| CCM | REM |
|---|---|
| 1.1 Preconditioning | 1.1 Preconditioning |
| 1.2 1.1.2 Vehicle Speed (if the CCM has the sensor) | 1.1.1 Wheel Position and Velocity |
| 1.1.3 Roll Accelerometer | 1.1.2 Vehicle Speed (if the REM has the sensor) |
| 1.1.4 Pitch Accelerometer | |
| 1.2 Tests for Component Failures | 1.1.2.1 Vehicle Speed Modifications (always in REM) |
| 1.2.1 Speed Sensor Test (if the CCM has the sensor) | 1.1.5 Gain Control |
| | 1.2 Tests for Component Failures |
| 1.2.2 Roll Accelerometer Test | 1.2.1 Speed Sensor Test (if the REM has the sensor) |
| 1.2.3 Pitch Accelerometer Test | |
| 1.2.7 CCM & CAN Tests | |
| 2.0 Leveling process | 1.2.4 Position Sensor Test |
| | 1.2.5 Solenoid Power (overheating) Test |
| | 1.2.6 Temperature Sensor Test |
| | 1.2.7 REM Tests |
| | 1.2.8 Solenoid Function (short/open) Test |
| | 1.3 SNF |
| | 1.4 UNF |
| | 1.5 BTO |
| | 1.6 Roll |
| | 1.7 Pitch |
| | 1.8 Pumping down |
| | 1.9 Load, Valve & Solenoid Compensation |
| | 1.10 Compliance Emulation & PWM Conversion |
| | 1.11 Calibrate Mode |

Each suspension control unit controls the damping forces in the compression and rebound directions in accord with control provided by the CCM and wheel controller interaction. The control signals are delivered to the dampers 412 via CAN bus line 425 for compression and rebound. In the REM software implemented process, each solenoid valve has an associated accumulator. Each accumulator is cleared at the start of an operational cycle and the control signals from each process stage are summed into it. The total at the end of each cycle is transferred to an appropriate pulse width modulator (PWM) that applies the control signals to the solenoids. The PWM has a minimum of 10-bit control resolution. Any values greater than a predetermined maximum remain at the maximum and any values below zero will remain at zero.

Figure 5:
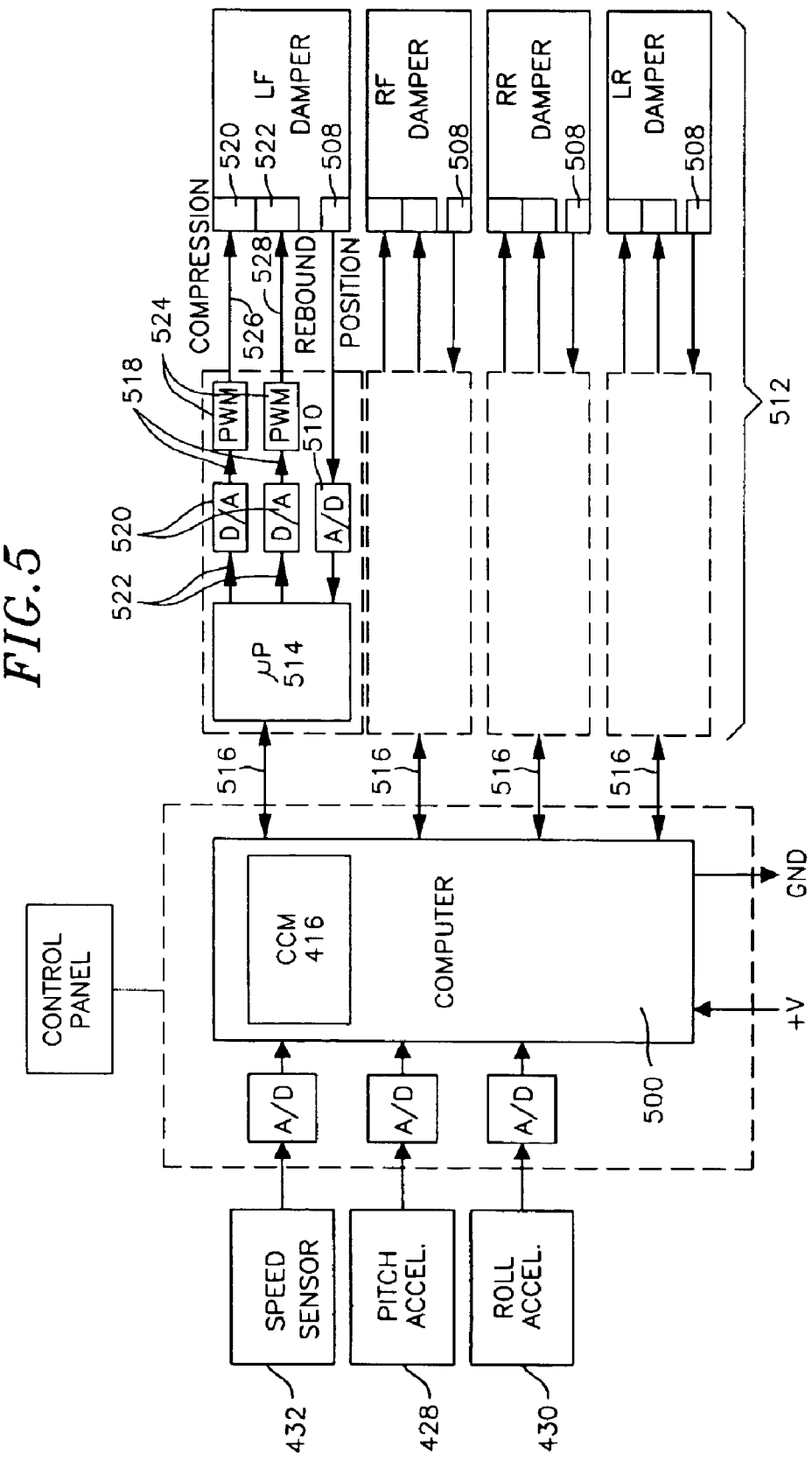
FIG. 5 is a block diagram of the computer control system for the D/A and A/D conversions and solenoid control of the present invention.

FIG. 5 is a block diagram showing the computer control system for the D/A and A/D conversions, sensors and solenoid control of the present invention. The CCM 416 receives data from sensors 432, 430 and 428, respectively, corresponding to the vehicle speed, roll acceleration and pitch acceleration. Additionally, the CCM receives from the wheel position sensors 508 through analog-to-digital converters 510, the positions or extensions of the extensible damper shaft of the suspension control units 512 indicating a wheel to body displacement. The CCM in concert with the appropriate wheel controller 514 utilizes the above described data inputs to determine the desired damper forces in the compression and rebound directions for each wheel.

The CCM and the wheel controllers each comprises standard elements such as CPU, RAM, ROM and the like for processing the input position signals into the desired output force. Similarly, the output force signals to the pressure regulators 518 in each damper are converted from digital form to a form appropriate for operation of the regulator 524.

Exemplary CCM 416, and REM's 490 comprise microcomputers such as a Siemens model C167CR processor with 20 MHz/16 bit performance and flash RAM.

A speed sensor 432 provides speed data to the CCM. The speed sensor may be a Hall-effect sensor which detects a magnet connected to a drive shaft or other power train component. Many modern vehicles include some form of speed sensor for producing digital speed information, often associated with the vehicle transmission or with an anti-lock braking system (in which case a sensor is present for each wheel). The A/D converter has a resolution of 1 mph/LSB. The speed sensor is monitored by a bipolar 7 bit minimum resolution A/D converter (+128 levels) or pulse width counter, depending on the type of sensor.

A pitch sensor 428 provides pitch data to the CCM. The pitch sensor is an accelerometer that provides a bipolar output voltage that is positive upon vehicle acceleration (front higher than the rear) and negative upon vehicle braking (front lower than the rear). A roll sensor 430 provides pitch data to the CCM. The roll sensor accelerometer provides a bipolar output voltage that is positive upon a right turn (left side lower than the right) and negative upon a left turn (left side higher than the right).

The output of the accelerometers 428 and 430 is monitored by two bipolar 10 bit minimum resolution A/D converters (±512 levels). The actual acceleration in G's (gravity constant) per LSB is equal to 0.005 G's/LSB. Resolution is factory calibrated, calibration to zero the sensor is done after installation. The zero offsets are set during a vehicle calibration cycle. A suitable dual accelerometer is the ADXL202 by Analog Devices, Inc. of Norwood Mass.

A temperature sensor in the REMs 490 provides temperature data to the CCM. Temperature sensors may be supplied for up to 6 SCUs. The use of a temperature sensor provides the ability to retrieve the absolute position from a sensor mounted on the reservoir that drifts with temperature. It is also preferable to have absolute position for bottoming/topping out control. The actual temperature resolution is equal to 1° F./LSB and cover the range from −50° F. to +250° F. An alternative use of a temperature sensor is to automatically reduce damping forces if the temperature rises too high, such as for racing or military applications. The analog input to the A/D converter should be filtered so that it is down approximately 3 db at 1 Hz.

A set of hydraulic pressure regulators 520,522 controlled by the CCM controls the flow of hydraulic fluid in the SCU. Hydraulic pressure regulators 520, 522 are controlled by the amount of electrical current received. In the exemplary embodiment, the output signals of the wheel controller 522 to the D/A converter 520 are transferred via lines 518 to pulse-width modulator (PWM) converter circuitry 524. A pulse-width-modulated (PWM) signal 526, 528 is then applied to each of regulators 520, 522 to adjust the force applied by the damper in compression or rebound, respectively.

A set of solenoids is provided to actuate the hydraulic pressure regulators. The solenoids control the damping forces linearly as a function of current. The pressure regulator incorporates a solenoid controlled poppet valve to adjust the pressure exerted on the fluid by opening or closing to relieve or exert pressure on the fluid. This valve must operate at significant speeds while maintaining stability and reliability. The valve must also incorporate an integrated check valve to prevent reverse flow of fluid. The poppet valve is described in more detail in co-pending U.S. application entitled Suspension Control Unit and Control Valve, filed Nov. 11, 1999, U.S. patent application Ser. No. 09/439,107, the disclosure thereof is incorporated herein in its entirety by reference thereto.

Figure 6:
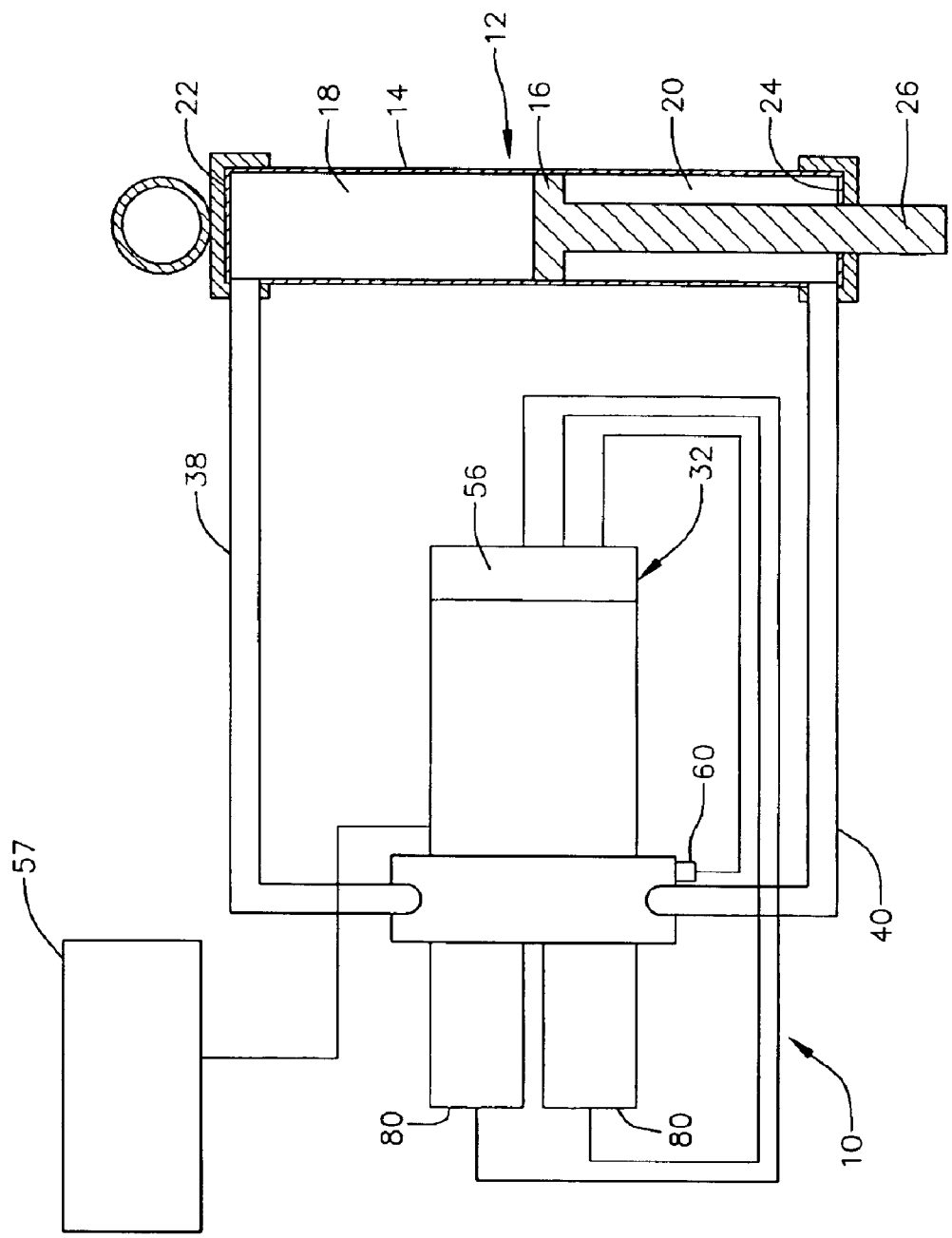
FIG. 6 is a schematic of the suspension control unit of the present invention.

In a preferred embodiment, a fluid control unit 10 is coupled to each actuator 12 of a vehicle via fluid conduits, i.e., hydraulic lines, 38, 40 as shown in FIG. 6. Each fluid control unit with its corresponding actuator for a suspension control unit. The fluid control unit may be separate from the actuator or may be integrated with the actuator.

Each actuator typically comprises a cylindrical housing 14. The actuator cylindrical housing (also referred to herein as a "cylinder") used in the system are filled with a fluid. A piston 16 is fitted within the cylinder and reciprocates longitudinally along the cylinder. The piston divides the cylinder into two chambers, i.e., a first chamber 18 and a second chamber 20, each filled with fluid. In the exemplary embodiment, each chamber is filled with hydraulic fluid.

The first chamber extends from a first end 22 of the cylinder to the piston 16. The second chamber extends from a second end 24 of the cylinder to the piston 16. The volume of each chamber changes as the piston reciprocates along the length of the cylinder. A shaft 26 longitudinally aligned with the cylinder 14 is connected to the piston 16 and extends externally beyond the second end 24 of the cylinder. As the shaft is moved in or out of the cylinder it causes the piston to reciprocate within the cylinder.

Figure 7:
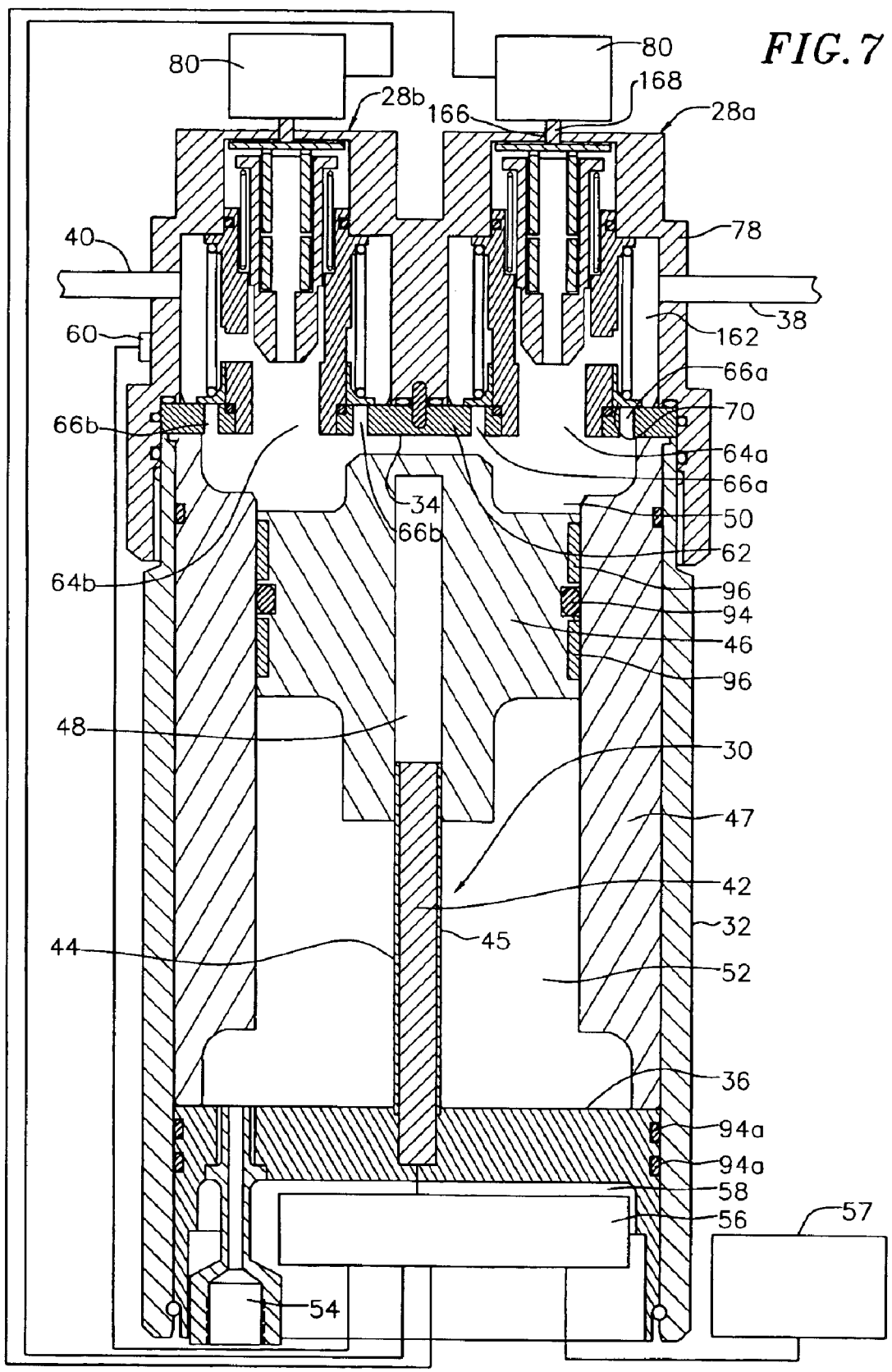
FIG. 7 is a cross-sectional view of a fluid control unit of the present invention.

Referring to FIG. 7, the fluid control unit 10 comprises one but preferably two solenoid driven control valves 28*a*, 28*b* and a Linear Variable Inductive Transformer ("LVIT") position sensor 30 housed within a reservoir 32, referred to herein for convenience as the "sensor reservoir". The fluid control unit also comprises a microprocessor controller 56 (the "microprocessor"). An optional second computer controller 57 may also be connected to each fluid control unit on the vehicle. If a second computer controller is used, then all of the fluid control units in vehicle are preferably connected to a single computer controller 57. Preferably, the microprocessor controller is mounted on the reservoir.

The sensor reservoir is preferably a cylindrical chamber having a first end 34 opposite a second end 36. One but preferably, two solenoid driven pressure regulating valves control the inflow of fluid to the sensor reservoir. A first fluid line 38 couples the first solenoid valve 28*a* to the first actuator chamber 18 (FIG. 6). A second fluid line 40 couples the second solenoid valve 28*b* to the second actuator chamber 20. While the valves can be mounted at different locations on the sensor reservoir, in the exemplary embodiment shown in FIG. 7 they are mounted on the first end 34 of the sensor reservoir 32.

The LVIT sensor comprises a bobbin 42 with a wire 44 coiled around it. The bobbin extends perpendicularly from the second end 36 of the sensor reservoir. A potting material coating 45 is formed over the coil. The coil creates a field. A sensor piston 46, preferably made from aluminum, slides within the sensor reservoir. The sensor piston 46 has an opening forming a sleeve 48 extending perpendicularly within the sensor piston body as shown in the exemplary embodiment depicted in FIG. 7. A preferred LVIT sensor is made by Lucas Controls. Alternatively, the sleeve may be in the form of a tube extending perpendicularly from the sensor piston 46. In a further alternate embodiment (not shown), the sleeve may extend from the second end 36 of the sensor reservoir while the bobbin may extend from the sensor piston 46.

The sensor piston divides the sensor reservoir into a first portion 50 in communication with the control valves 28*a*, 28b and a second portion 52. Consequently, the sensor reservoir first portion receives fluid from the actuator 12. The volume of the first and second sensor reservoir portions change as the sensor piston reciprocates along the reservoir length. The sensor reservoir second portion between the second end of the sensor reservoir and the piston is filled with pressurized gas, and preferably with $N_2$ at preferably at about 250 psi. This is typically accomplished through a fitting 54 having an air valve (not shown)mounted to the second end 36 of the sensor reservoir. The pressurized gas applies a force against the piston and thus, against the fluid in the first portion of the sensor reservoir on the other side of the piston.

An end cap 58 is defined at the second end 36 of the reservoir. The end cap 58 has a double O-ring 94a to help seal the high pressure gas stored in the sensor reservoir second portion. The reservoir piston 46 also has two Teflon slide rings 96 that allow the piston to move smoothly within the chamber. An insert sleeve 47 is optionally added within the chamber to allow the chamber to accommodate different diameter pistons 46. The stroke of the piston 46 is a function of the volume of fluid displaced by the actuator piston with rod. By allowing different size pistons 46, the reservoir of a fluid control unit can be used for different size actuators without re-designing the entire fluid control unit.

As fluid enters or leaves the sensor reservoir first portion it causes the piston and thus, the sleeve to slide over the coiled bobbin. As the sleeve slides over the coil it destroys the field generated by the coil portion covered by the sleeve. Because of its function, the sleeve is commonly referred to as a "spoiler". The field is monitored by a microprocessor 56. The microprocessor is preferably a computer module which is fitted in an end cap 58 defined behind the second end of the sensor reservoir.

In the exemplary embodiment shown in FIG. 7, each solenoid control valve is mounted on an interface plate 62 mated externally to the first end 34 of the sensor reservoir 32. The interface plate has two main openings 64a, 64b to accommodate the flow through each control valve and into the reservoir. In addition the interface plate has one but preferably an annular row of by-pass openings 66a, 66b, surrounding each of the main opening, respectively. Flow through the by-pass openings surrounding a main opening are controlled by a check valve 70 which is integral to the control valve controlling the flow through the main opening. Openings corresponding to the main openings and by-pass openings are also formed on the first end 34 of the sensor reservoir so that the main and bypass openings can communicate with the sensor reservoir first portion. Since it is desirable in the embodiment incorporating two control valves that both control valves are identical, only the first control valve 28a is described herein.

Referring to FIGS. 6 and 7, as the actuator piston 16 and shaft 26 move toward the actuator cylinder first end 22, i.e., as the piston and shaft retract within the cylinder 12, the piston 16 displaces fluid from the actuator first chamber 18 through the first fluid conduit 38 and the first control valve 28a and into the LVIT sensor reservoir first portion 50 moving the sensor piston 46 toward the sensor reservoir second end and over the bobbin 42. Simultaneously, fluid is drawn into the second chamber 20 of the actuator through the second valve 28b and second fluid conduit 40 via the by-pass openings 66b. However, because of the piston shaft 26 within the actuator housing second chamber 20, for a given retracting actuator piston stroke, the amount of fluid drawn into the second chamber is less than the amount of fluid displaced from the first chamber. Consequently, as the actuator piston retracts (i.e., slides toward the first end of the cylinder), fluid is accumulated in the sensor reservoir first portion 50 causing the LVIT sensor piston 46 to slide toward the sensor reservoir end 36 such that the spoiler 48 slides over the wire coil destroying the field generated by the spoiler covered coil.

Similarly, as the actuator piston 16 and shaft 26 move in an extending direction (i.e., toward the cylinder second end 24), the amount of fluid displaced from the actuator second chamber 20 is less than the amount of fluid drawn into the actuator first chamber 18. As a result, fluid is withdrawn from the sensor reservoir first portion 50 causing the LVIT piston to move away from the sensor reservoir second end 36 and toward the sensor reservoir first end 34 and expose more of the coil windings, thereby increasing the strength of the field generated by the coil. Movement of the sensor piston 48 when fluid is withdrawn from the sensor reservoir first portion is caused by the suction created by the withdrawing fluid. The pressurized gas in the second portion 52 of the sensor reservoir serves to prevent a vacuum from forming in the reservoir first portion which would result in undesirable fluid cavitation.

The microprocessor 56 is calibrated for ascertaining the position of the piston within the cylinder by monitoring the strength of the field generated by the coil. To account for the expansion and contraction of the fluid volume due to temperature changes, an optional temperature sensor 60 is coupled to the sensor reservoir and to the microprocessor. Typically, the temperature sensor is mounted on the valve housing 78. An exemplary sensor is the 1M10023-B3 temperature sensor manufactured by Dale Electronics. This temperature sensor has a linearity of less than 1% and an operational range of −50° to 250° F. The temperature sensor sends signals to the microprocessor relating to the temperature of the fluid. The microprocessor then re-calibrates the position of the actuator piston 16 accounting for fluid volume expansions or contractions due to temperature changes thereby ascertaining the absolute position of the actuator piston. If the computer controller doesn't require absolute position, the temperature sensor is not required.

Figure 8:
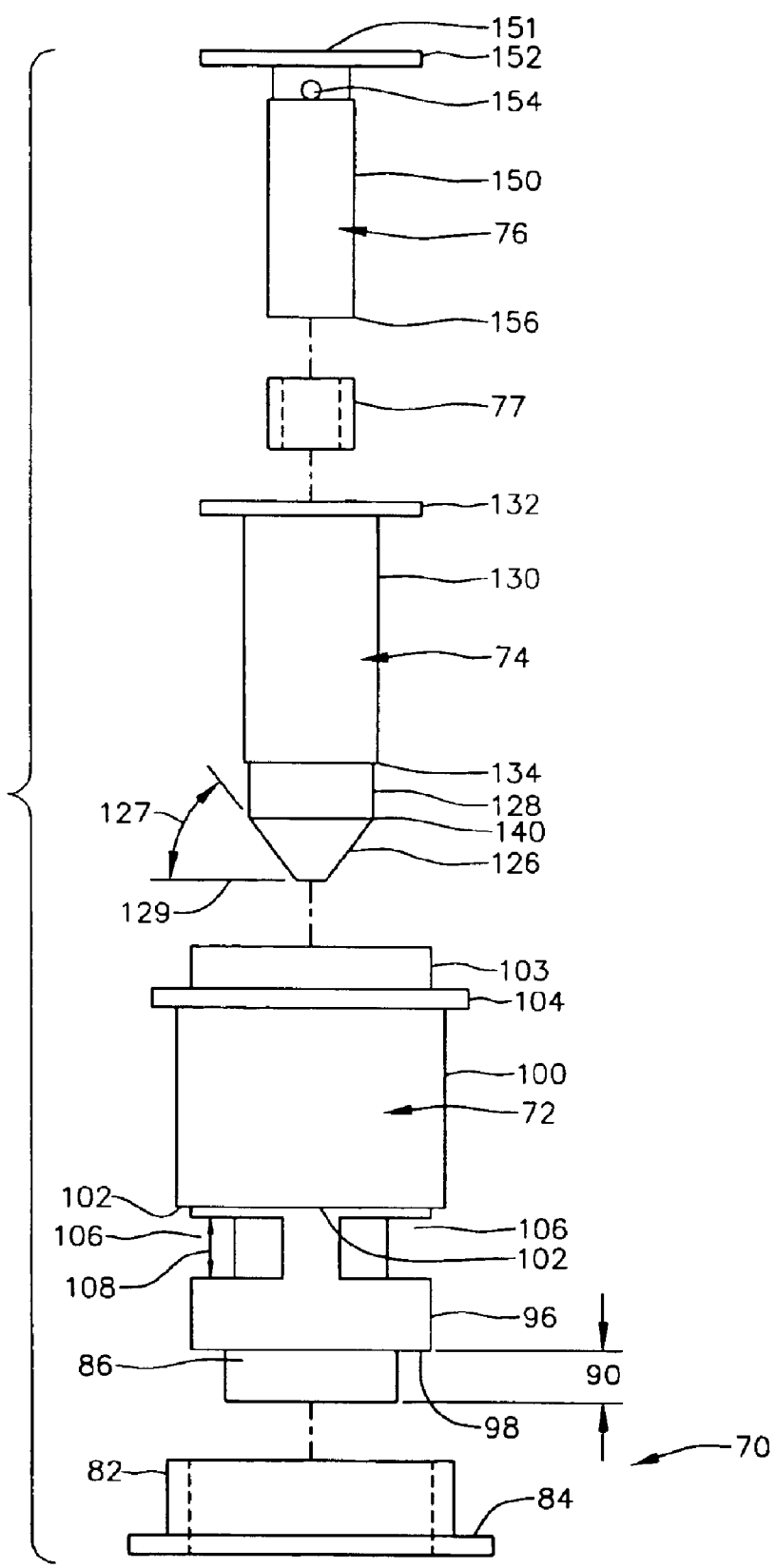
FIG. 8 is an exploded side view of an exemplary control valve of the present invention excluding the springs and housing.
Figure 9:
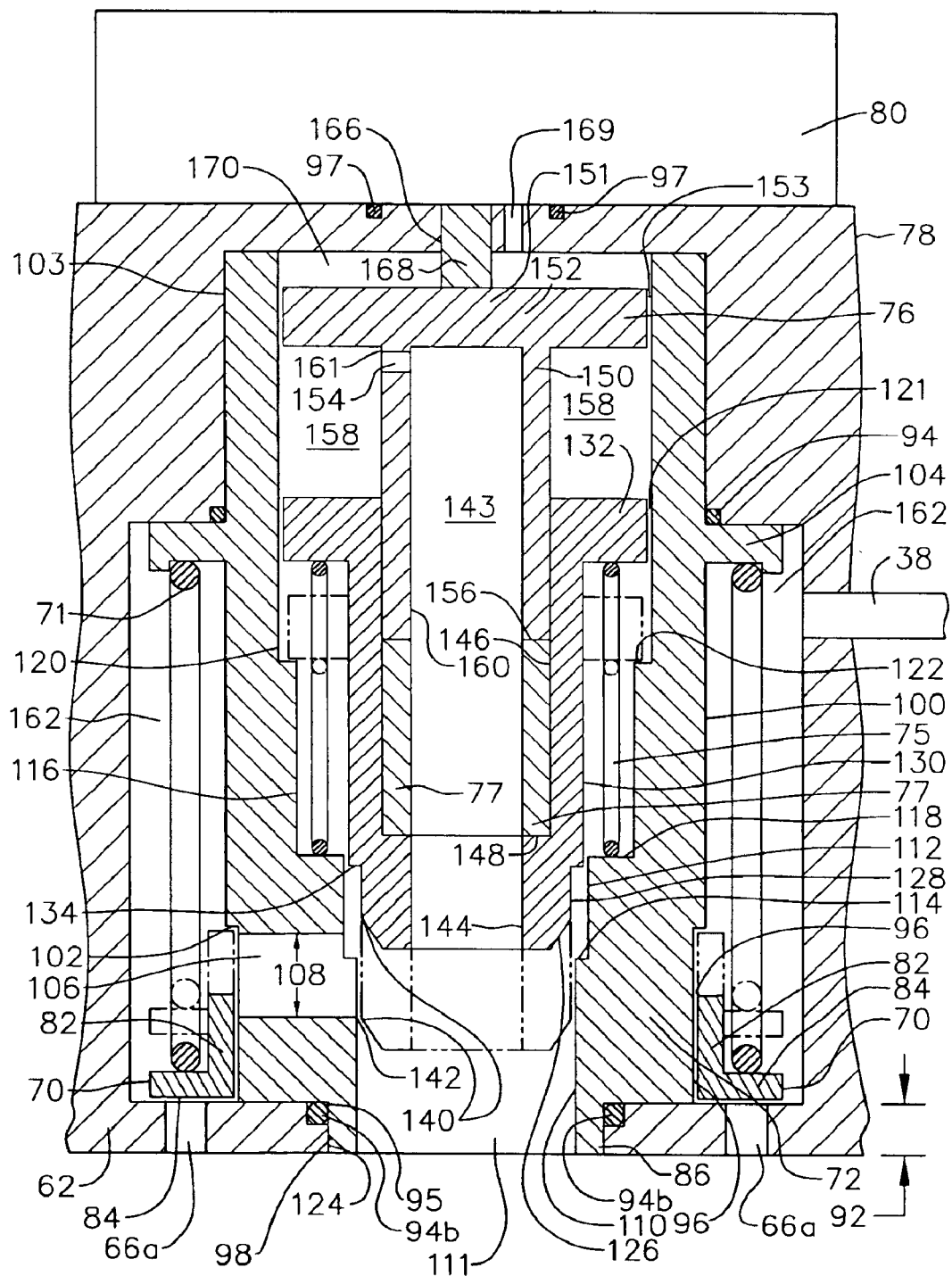
FIG. 9 is a cross-sectional view of the exemplary control valve shown in FIG. 8.

Referring to FIGS. 7–9, each control valve comprises a check valve 70, a check valve spring 71, a main body 72, a poppet 74, a poppet spring 75, a solenoid damper 76, a de-coupling member 77, a housing 78 and a solenoid 80.

An exemplary check valve 70 is an annular member having an "L" shaped cross-section. In other words, the check valve comprises an annular circumferential wall 82 from which extends a radially outward annular flange 84. The circumferential wall defines an inner opening 86. The check valve is positioned over the interface plate 62 of the sensor reservoir such that its annular flange 84 covers the by-pass openings 66a formed on the interface plate.

The valve main body 72 is generally cylindrical and preferably made from steel. For descriptive purposes the exemplary valve body outer surface described herein is divided into three sections. The outer surface first section 86 has a diameter slightly smaller than the diameter of the main opening 64a formed on the interface plate. The first section spans a length 90 not greater than the thickness 92 of the interface plate and preferably has a length equal to the thickness of the interface plate.

A second outer surface section 96 extends from the outer surface first section and has a diameter greater than the diameter of the first section. Consequently, an annular shoulder 98 is formed at the base surface of the second section 96 at the intersection between the outer surface first and second sections. For descriptive purposes this shoulder is referred to herein as the body "first outer annular shoulder". The body outer surface second section has a diameter that is slightly smaller than the inner diameter of the check valve annular wall 82.

A third outer surface section 100 extends from the second outer surface section 96. The third outer surface section has a diameter larger that the diameter of the second outer surface section. Consequently, a body second outer annular shoulder 102 is defined by the base of the third section at the intersection between the second and third sections. The third outer surface section diameter is greater than the inner surface diameter of the check valve. An annular flange 104 extends radially from the end of the third section opposite the body second outer annular shoulder 102.

A fourth outer surface section 103 extends from the third section 100 adjacent to the annular flange 104. Preferably, the fourth section diameter is slightly smaller than the diameter of the third section.

Annular section slots 106 are formed through the second outer surface section 96 adjacent to the third outer surface section 100. The annular section slots penetrate the entire thickness of the body 72. In a preferred embodiment, four equidistantly spaced annular section slots 106 are formed on the body penetrating through the second outer surface section. The slots have a width 108 along the length of the valve body.

The inner surface of the body is also divided into three sections for descriptive purposes. The first or smallest diameter section 110 spans the outer surface first section 86 and a portion of the outer surface second section 96. The first inner section defines an end opening 111 of the valve body which communicates with the annular slot sections. A second inner section 112 extends from the first inner section and extends to a location within the third outer surface section 100. Consequently, a first inner annular shoulder 114 is defined by the body inner surface first section at the intersection between the body inner surface first and second sections.

A body inner surface third section 116 extends from the second inner surface section 112 and has a diameter larger than the diameter of the body inner surface second section. Consequently, a second inner annual shoulder 118 is formed of the intersection of the inner surface second and third sections. The body inner surface third section extends to a location within the third outer surface section 100.

A fourth body inner surface section 120 extends from the third inner section. The inner surface fourth section has a larger diameter than the inner surface third section. Thus, a third inner annular shoulder 122 is defined between the body inner surface third and fourth section. The body inner surface fourth section extends to the fourth outer surface section 103.

The valve body 72 is mounted on the interface plate 62 with the first outer section 86 penetrating the annular check valve 70 and the main opening 64*a* on the interface plate. Prior to mounting the body onto the interface plate, the check valve spring 71 having an inner diameter slightly larger than the diameter of the body outer surface third section is fitted over the annular check valve such that the spring surrounds the circumferential wall 82 of the check valve and rests on the annular flange 84 of the check valve. The body is mounted within the spring on the interface plate such that the spring is sandwiched between the check valve annular flange 84 and the annular flange 104 extending from the valve body outer surface. When the body is mounted on the interface plate 62, the first annular shoulder 98 rests on the interface plate. A seal 94*b* surrounding the outer surface of the body outer surface first section 86 provides a seal between the outer surface first section and the interface plate edge 124 defining the main opening 64*a*. In this regard, the seal 94*b* provides a seal between the body outer surface and the interface plate.

The poppet 74 is fitted within the valve body sandwiching a poppet spring 75. The poppet is also preferably made of steel. The poppet comprises a frustoconical (also referred to herein as a "conical") outer surface section 126 from which extends a cylindrical outer surface first section 128 from which extends a cylindrical outer surface second section 130. The second section 130 was a diameter larger than the diameter of the outer surface first section 128. Consequently, a poppet outer annular shoulder 134 is defined by the second poppet outer surface section 130 at the intersection between the poppet first and second outer surface sections. An annular flange 132 extends radially from the end of the second cylindrical section 130. The poppet annular flange 132 has an outer diameter smaller than the body inner surface fourth section 120 and greater than the diameter of the body inner surface third section 116. An annular gap 121 is defined between the annular flange and the body inner surface fourth section which is large enough so as to not restrict fluid flow during rapid movements of the poppet during valve operation. The conical section 126 is a section of a 70° cone, i.e., it is a section that is tapered at an angle 127 of 55° from a plane 129 perpendicular to the central axis of the cone (FIG. 8). The poppet outer surface first section 128 has an outer surface diameter slightly smaller than the diameter of the poppet body inner surface first section 100. The diameter of the poppet outer surface second section 130 is slightly smaller than the diameter of the valve body inner surface second section 112 but greater than the diameter of the body inner surface first section 110.

The poppet spring 75 is seated within the body second inner annular shoulder 118 prior to fitting the poppet within the body. The poppet spring has an inner diameter greater than the diameter of the poppet outer surface second section 130 but smaller than the diameter of poppet annular flange 132. The poppet spring outer diameter is smaller than the diameter of the body inner surface third section 116. When the poppet is within the valve body 72, the spring is sandwiched between the poppet annular flange 132 and the body second inner annular shoulder 118.

The poppet can push against the spring force generated by the poppet spring until the poppet annular flange 132 engages the third inner annular shoulder 122 of the body. In other words, the third inner annular shoulder 122 serves as a stop to the stroke of the poppet within the valve body. When the poppet is stopped against the third inner annular shoulder 122, the entire width 108 of the annular section slots 106 formed through the valve body are covered by the poppet outer surface first section 128 and a portion of the poppet outer surface second section 130. In a preferred embodiment, when the poppet is stopped against the valve body third inner annular shoulder 122 as shown by the dashed lines in FIG. 9, the annular edge 140 defined at the intersection of the poppet outer surface conical section 126 and the poppet outer surface first section 128 is aligned with the annular section edges 142 of the annular section slots 106 at the body inner surface first section 110. The poppet has an inner cavity 143 having a first inner surface portion 144 and a second inner surface portion 146. The second portion has a larger diameter than the first portion whereby a poppet inner annular shoulder 148 is defined at the intersection between the two inner surface portions. A compliant de-coupling member (also referred to herein as a "de-coupler"), preferably a polyurethane or other plastic cylindrical member 77, is fitted within the poppet and rests against the poppet inner shoulder 148.

The solenoid damper 76 is coupled to a solenoid 80 via a solenoid piston 168 and comprises a cylindrical member 150 having an inner cavity 158 and a cap 151 defining an annular flange 152 extending radially from an end of the cylindrical member. The outer surface diameter of the cap is slightly smaller than the diameter of the body inner surface fourth section 120. A passage 154 is formed through the cylindrical member 150 near the annular flange 152 providing a passage between the inner surface 160 and the outer surface 161 of the cylindrical member. The passage 154 should be large enough (or consist of several holes) so as to not restrict fluid flow during rapid movements of the poppet during valve operation. A preferred solenoid is an Elwood Corporation solenoid having part number 160071-202. This type of solenoid is typically referred to as a "Linear Servo Solenoid" because it provides a constant force over the entire range of its stroke. This constant force is necessary for proper operation of the control valve as a pressure regulator, as the force must be constant regardless of the position of the poppet 74.

The solenoid damper 76 is fitted within the poppet cavity 143 such that the end 156 of the solenoid damper cylindrical member 150 can come into contact with the de-coupling member 77. The solenoid damper annular flange 152 remains external to the poppet cavity and defines an annular space 158 with the annular flange 132 of the poppet. The passage 154 formed on the cylindrical member 150 of the solenoid damper provides a passage between the inner surface 160 of the cylindrical member and the annular space 158.

A housing 78 is fitted over the valve body 72. In the exemplary system shown in FIG. 7, the housing is mounted over the interface plate 62 on the sensor reservoir 32. The housing is fastened or otherwise connected to the sensor reservoir and retains the control valve in position on the reservoir. A valve annular chamber 162 is formed between the housing inner surface and the body outer surface. The check valve 70 and check valve spring 71 are located within the valve annular chamber 162. The valve annular chamber 162 is in communication with the annular section slots 106. The fluid conduit 38 is coupled to the housing typically via a fitting (not shown) and is in communication with the valve annular chamber 162. As such, fluid from the fluid conduit 38 is delivered to the valve annular chamber 162 and fluid from the annular chamber 162 can flow back through the fluid conduit 38.

In a preferred embodiment, the solenoid 80 is external of the housing 78 and is coupled to the solenoid damper 76 through an opening 166 formed on the housing. A piston 168 of the solenoid penetrates the housing for providing the appropriate force on the solenoid damper and thus, the poppet. A seal 97, preferably an O-ring seal, is provided in surrounding relationship to the piston 168 so to prevent the escape of fluid from the opening 166. Furthermore, the solenoid is a "wet" solenoid, in that it receives fluid from valve housing via a passage 169 formed through the housing adjacent to the solenoid piston 168. By letting the pressurized fluid surround the solenoid's internal piston core (not shown), the force required for the solenoid to push the solenoid piston 168 can be kept lower than if the piston core was not surrounded by the pressurized fluid. This is because the differential between the pressure in the solenoid and the pressure acting against the poppet is reduced.

The entire assembly contains numerous O-rings 94 for properly sealing chambers from each other and preventing fluid from escaping the system, as can be seen in FIGS. 7 and 9.

In operation, the LVIT sensor 30 and the optional temperature sensor 60 are used by the microprocessor 56 to ascertain the position of the actuator piston 16 relative to the actuator 12. The microprocessor 56 uses this information to perform calculations that determine the desired pressure setting for each valve 28a or 28b. The microprocessor 56 then provides the appropriate electrical signals to the solenoids 80 to cause them to generate the desired pressure settings.

A typical vehicle application incorporates a suspension control unit (with a microprocessor 56) at each corner (wheel). In an optional embodiment, there may be another microprocessor 57 in communication with all of the suspension control unit microprocessors 56. This "central" microprocessor 57 can distribute additional sensor signals, such as vehicle speed, cornering conditions, braking, etc. for more sophisticated calculations and thus improved performance.

To apply the appropriate control force to the poppet, the solenoid 80 pushes on the solenoid damper, which pushes on the de-coupling member 77, which in turn pushes on the poppet inner shoulder 148. The movement of the solenoid valve is opposed by the poppet spring 75. When the solenoid is deactivated, the poppet spring retracts the poppet from its seated position causing the solenoid damper to retract and displace the solenoid piston. The poppet may be pushed by the solenoid damper until the poppet flange 132 is stopped against the valve body third inner shoulder 122. The de-coupler 77 forms a very stiff spring that helps quiet the metal-to-metal impact each time the poppet shoulder 132 contacts the valve body third inner shoulder 122. In essence, the de-coupler quiets the hammering of the solenoid piston as it is activated and deactivated. The de-coupler also helps the valve to retract faster by allowing the poppet to start moving upward against the solenoid even before the relatively large mass of the solenoid has a chance to move.

When the poppet is completely seated within the body, i.e., when the poppet flange 132 is seated on the body third inner shoulder 122, the poppet blocks the flow through the valve body end opening 111 thereby preventing the flow of fluid through the valve body 72 and thus through the control valve 28a. At this position, the annular edge 140 defined at the intersection between the poppet conical outer surface 126 and the poppet outer surface first section 128 is preferably at the same level with, or is below, the edge 142 of the slots 106 located on the body inner surface first section 110.

When the poppet is fully seated in the valve body, fluid displaced from the actuator to the valve annular chamber 162 generates a fluid pressure through the flow slots 106 which is reacted against the poppet outer shoulder 134. The poppet outer shoulder 134 is always fully exposed to the slots 106 and thus, to the fluid pressure, regardless of the position of the poppet. Consequently, the fluid pressure provides a force against the exposed poppet annular shoulder 134 tending to retract the poppet. In conventional poppet style pressure regulating valves, the pressure sensing shoulder is formed at the valve seat where the flow occurs. With conventional poppet valves, when the valve is in the closed seated position, a portion of the poppet conical surface is exposed to the side opening while it simultaneously blocks the end opening of the cylindrical body. The only force generated for unseating the poppet is generated by the pressure from the fluid flow being reacted against the conical surface of the poppet. Consequently, a force is generated tending to retract the poppet toward a position not blocking the side opening and the end of the cylindrical body. As the poppet is retracted further, the force generated against the conical surface is increased as most of the conical surface is exposed to the fluid flow. This causes stability problems because the pressure sensing area can be effected by dynamic flow forces. In the inventive valve, the pressure sensing area is located at the annular shoulder 134, which is out of the path of the flow and therefore less effected by dynamic flow forces. Moreover, because the movement of the poppet in the control valve of the present invention is stopped when the poppet flange 132 engages the third inner annular shoulder 122 formed on the valve body, the valve body is not loaded by the tip of the poppet as is done in conventional poppet valves where the stroke of the poppet is stopped when the poppet tip portion engages and plugs an end opening of the poppet valve body. Consequently, the control valve of the present invention alleviates the need to use expensive hardened steel to coat the inner valve body as is done with conventional poppet valves for strengthening the valve body which is exposed to the pounding by the poppet tip.

As the poppet is retracted, even slightly, from the fully seated position, the conical surface of the poppet is exposed to the slots 106. Applicant has discovered that a conical surface which is a section of a 70° cone, i.e., a conical surface whose surfaces are tapered at 55° relative to a plane perpendicular to the central axis of the conical surfaces, provides nearly flat pressure regulation over varying flow rates, i.e., it causes the poppet to retract or seat just enough to cancel any increase or decrease in pressure that would form as a result of increased or decreased fluid flow, respectively. Moreover, applicant discovered that with the 55 tapered conical surface, the retracting force generated by the fluid pressure canceled out the dynamic flow forces generated by the fluid flow.

When the piston 16 in the actuator 12 is moving in a direction that is pushing fluid through fluid line 40, i.e. as the actuator piston is moving in an extending direction, the pressure in the actuator second chamber 22 will be regulated by the valve 28*b*. After the fluid passes through the valve 28*b* it flows through the sensor reservoir 32 and returns to the actuator chamber 18 through the by-pass opening 66*a* and fluid line 38. The by-pass openings 66*a* are normally blocked by the check valve flange 84, which is held down by the check valve spring 71. But while the fluid in the actuator second chamber 22 is being displaced via fluid line 40, the actuator first chamber 18 is withdrawing fluid into it through fluid line 38. This results in a pressure drop in actuator first chamber 18 relative to the pressure in the sensor reservoir. As a result, the fluid pressure is reacted though the by-pass openings 66*a* and against the check valve annular flange 84 causing the check valve to retract against the check valve spring force provided by the check valve spring 71. When that occurs, hydraulic fluid can flow from the sensor reservoir 32 through the by-pass openings 66*a*, through the annular chamber 162 and through the fluid conduit 38 and back to the actuator first chamber 18. The pressure level is a function of the check valve spring 71 compliance, and is set as small as possible to minimize the required pressure drop. Moreover, the pressurization of the fluid resulting from the gas pressure in sensor reservoir chamber 52 prevents the pressure drop across the check valve from becoming negative which can cause undesirable formation of bubbles (e.g. if the fluid in the system is pressurized to 250 psi and the check valve requires a 10 psi drop to open, the pressure in the sensor reservoir chamber 50 would be 250 psi and the pressure in the annular chamber 162 would be 240 psi).

The check valve stroke is limited by the body first outer shoulder 102. When the check valve stroke is stopped against the body first outer shoulder 102, the check valve peripheral wall 82 blocks the flow slots 106 preventing any inflow of fluid through the solenoid valve body and into the sensor reservoir. When the fluid direction changes and the valve starts to operate as a pressure regulator, the check valve spring 71 closes the valve and the fluid pressure now acts to hold the check valve flange 84 over the by-pass opening 66*a*, forcing the flow through the valve slots 106 as desired. As can be seen the flow paths are mutually exclusive—during pressure regulation the check valve is fully seated, i.e., closed, and flow is through slots 106, but during return flow the slots 106 are closed and flow is through the check valve opening. During the return flow a differential pressure is acted on the poppet causing the poppet to seat, i.e., move to the closed position.

Fluid from the sensor reservoir also fills the poppet cavity 143. Fluid from the cavity 143 also travels through the passage 154 of the cylindrical member 150 and fills the annular space 158 formed between the annular flange 152 of the solenoid damper and the annular flange 132 of the poppet. Moreover, fluid is able to flow past the annular flange 152 of the solenoid damper 76 and into a space 170 defined between the solenoid damper cap 151 and the valve housing 78. In order for the solenoid damper 76 to reciprocate, the fluid in the space 170 must pass back and forth through the annular gap 153 formed between the solenoid damper flange 152 and the valve body inner surface fourth section 120. This gap is carefully selected to ensure that the solenoid is adequately damped to prevent undesirable oscillations which would otherwise occur. Without such solenoid damping, the valve has a tendency to oscillate because the mass of the solenoid piston 168 and the solenoid magnetic force forms a sprung-mass system. Furthermore, when the poppet is retracted fluid is able to flow into the spaces between the body inner surface and the poppet outer surface. The fluid within the poppet and solenoid damper cavities and within the annular space 158 and space 170, as well as the fluid surrounding the poppet provide for damping of the poppet and solenoid damper vibrations that are generated as the solenoid is activated and deactivated.

The pressure drop through the valve is a function of the flow rate and flow opening size, i.e., the size of the opening defined between the edges 142 of the slots and the peripheral edge 140 defined at the intersection between the first and conical sections of the poppet. The operation of this valve forms a pressure regulator by automatically adjusting the flow opening size for varying flow rates. The constant pressure is automatically maintained by the balancing of forces between the solenoid force tending to close the valve and the pressure force on the annular surface 134 tending to open the valve.

The input to the solenoids is a pulse width modulated current from a 12 or 24 volt vehicle supply applied through a control switch and the solenoid to ground. The maximum current per solenoid (PS-16) is about 9 amps for 24 Volt systems and 18 amps for 12 volt systems. The resolution is at least 10 bits (1024 levels) of control, updated each 2.5 ms cycle by the REM.

Figure 10:
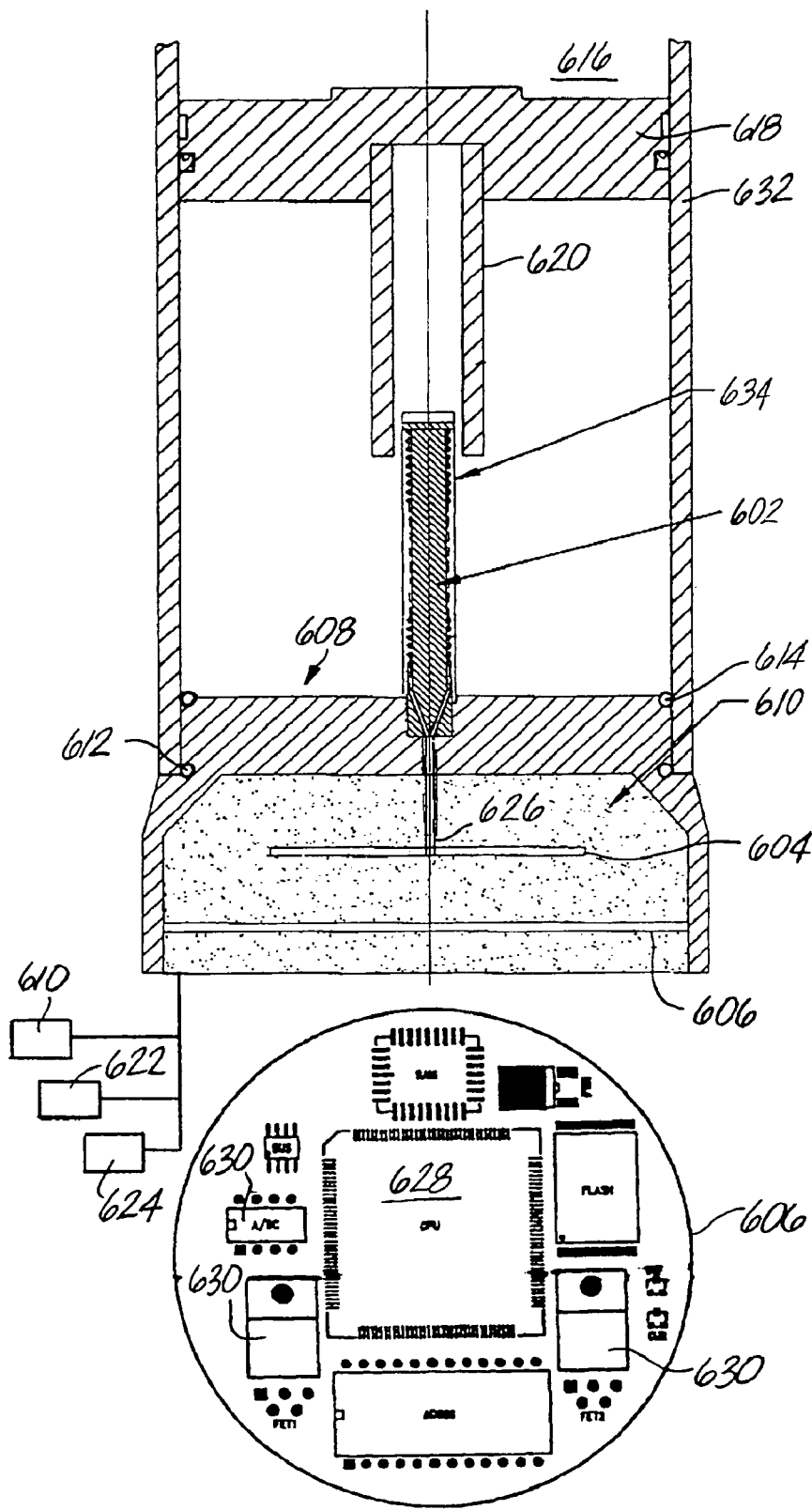
FIG. 10 is a cross sectional view of the Remote Electronics Module (REM) module.

FIG. 10 is a cross sectional view of the REM module. The REM module is a unitary assembly that provides a weatherproof package for the LVIT sensor 602 and printed wiring boards 604, 606. An exemplary position sensor is the LVIT-Z made by Lucas Control Systems of Hampton, Virginia.

The output of the position sensor is monitored by an A/D converter. Compression causes a positive position change and rebound a negative change. An alternative position sensor is the Series 240 (such as model 0243-0000) by Trans-Tek Inc. of Ellington, Conn.

The integral LVIT 602 mounted inside of the piston provides an environmentally sealed unit that is more compact and protected from harsh environmental conditions such as salt spray and road dirt. The REM 608 containing the LVIT mounts on top of a piston 632 assembly that has a reservoir 616. The REM caps the end of the piston protecting it from the environment. The cap is hollow and inside of the cap printed wiring boards 604, 606 containing individual wheel processor 628 and associated circuitry 630 are potted in epoxy 610 to protect them from the weather.

The LVIT's position 602 is fixed within the cylinder and when the fluid in the reservoir 616 expands and contracts pulling the piston 618 back and forth. A tube 620 attached to the piston moves up and down covering the LVIT sensor by varying amounts. The change in inductance of the winding of the LVIT changes in a predictable fashion as the aluminum tube covers it. This varying inductance is fed to the printed wiring board for processing. An opposing force in the cylinder is required to return the piston. This pressure is supplied by charging the opposite side of the cylinder with an inert gas under pressure. Alternatively, force to return the piston may be provided by a spring.

The REM module has four connectors, an input connector for the CAN ignition and power connection 610, an external temperature sensor connector 622 and a weatherproof connector to the solenoids 624. Inside of the potting cavity the pig tail wires from a LVIT 626 are attached to LVIT interface board 604. The LVIT interface board is coupled to a parent board 606 containing the microprocessor 628 and solenoid interface circuitry 630. The entire assembly is potted in epoxy 610 with the pig tail wires extending from it.

The entire assembly slides into the end of the reservoir cylinder 632 and is sealed by an O-ring 614 and is held securely in place by a snap ring 612. The windings over the bobbin are protected from abrasion from the piston spoiler 620 by an epoxy coating 634.

The hardware described above is actuated in response to a process programmed into the controller's memory to achieve the desired suspension control.

Figure 11:
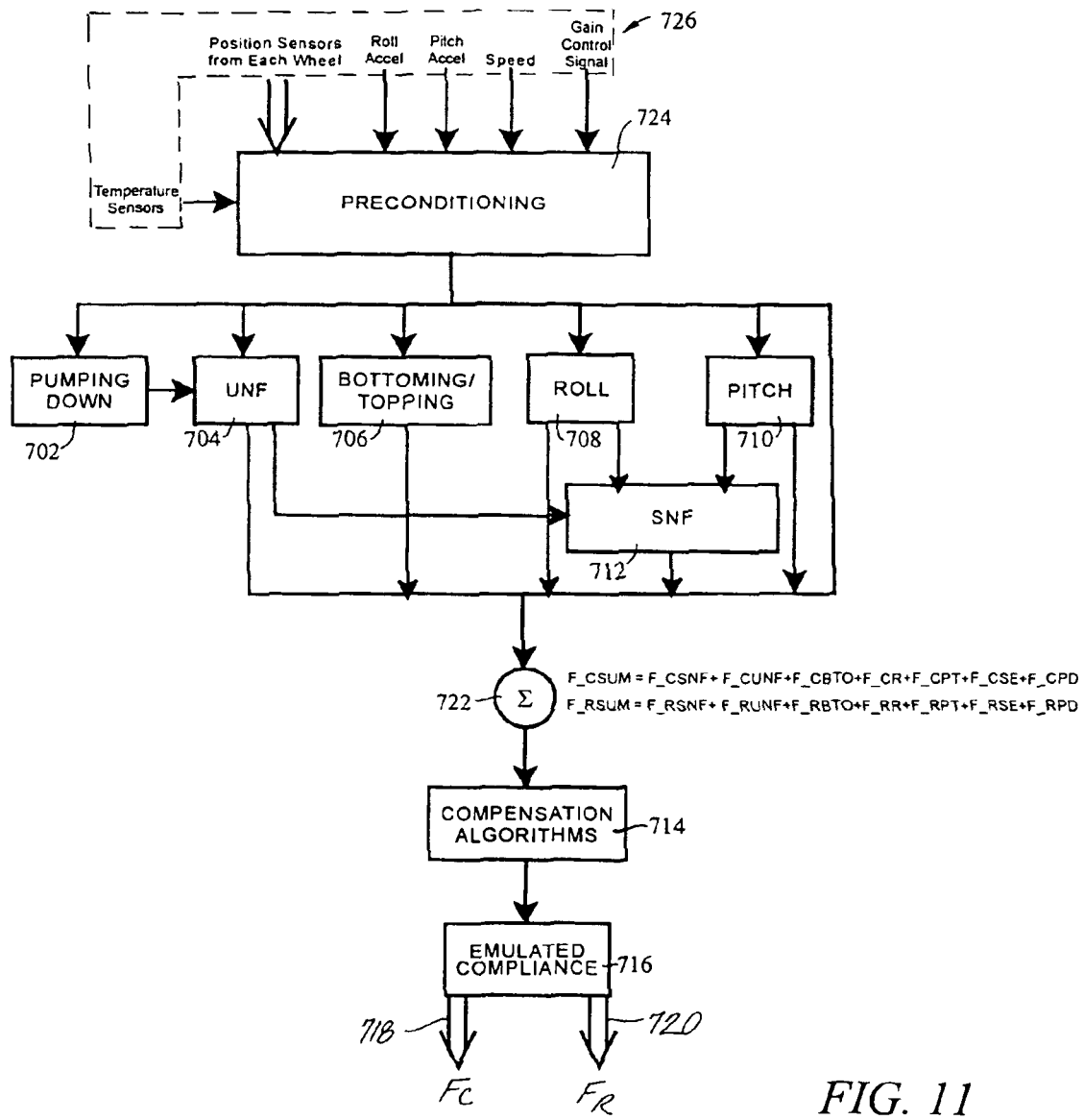
FIG. 11 is a block diagram of the overall computational process.

FIG. 11 is a block diagram of a computational process in accordance with the present invention. FIG. 11 shows the steps of the computational process utilized by a computer controller to execute a control system process of the present invention (step 306 of FIG. 8). The sequence is controlled by a computer program, preferably firmware in the computer controller. Calculations are performed by a CCM and distributed controllers as previously described under program control according to the process, and result in control signals that produce a desired ride.

FIG. 11 shows inputs, outputs and an overall operation of the damping control processes. A series of signal inputs 726 are preconditioned 724 and routed as inputs to a series of vehicle motion processes 702, 704, 706, 708, 710, 712, 714, 716. Each process for controlling a type of vehicle motion provides outputs that are summed 722.

For each motion process, the responses are calculated for both the compression 718 and rebound 720 directions. The results for each response are then summed 722 to provide the total desired compression 718 and rebound 720 damping forces at each wheel. A compensation process 714 adjust the parameter for added weight in the vehicle. An emulated compliance process 716 emulates mechanical compliance. Embodiments of the above processes advantageously utilize digital signal processing to ultimately determine $F_C$ and $F_R$.

An embodiment of the invention advantageously utilizes digital signal processing ("DSP") techniques in ultimately determining $F_C$ and $F_R$. DSP functions are advantageously implemented as software to process digitized data collected by the sensors of the embodiments. For example, the amplitude of motion at the natural frequency of the sprung mass is determined through the utilization of a Discrete Fourier Transform (DFT) for the various parameters described. The DFT determines the frequency and amplitude of the motion of a wheel coupled to an SCU. The LVIT sensor provides an analog position output that is digitized with A/D converters to a digital signal. The digital signal is an input to the CCM and wheel controller. The computer program resident in the CCM and Wheel controller utilizes DSP techniques to break the motion into its Fourier components for further processing.

The DSP isolates specific frequencies present so that a damping response can be provided for lower frequency inputs but higher frequency inputs can be ignored, thus weighing lower motion frequencies greater than higher motion frequencies. Thus, DSP is used to form a narrow bandwidth filter that attenuates frequencies above and below a center frequency it is set for. The DSPs in the particular implementation detects the sprung and unsprung natural frequencies of the vehicle in a sprung natural frequency ("SNF") 712 and unsprung natural frequency ("UNF") process respectively.

Integration of a signal's amplitude determined by the DFT process prevents the unwanted application of damping forces in response to high frequency bumps. For example in determining the SNF, quick movements caused by such bumps are superimposed on slower body movements at the sprung natural frequency. The sprung natural frequency is the center frequency of the filtering function of a DFT that is performing the integration. By integrating the high frequency movement caused by the bumps is rejected, smoothing the body movements. Thus, integration provides an additional reduction in the harshness encountered by passengers.

Returning to FIG. 11, a preconditioning process 724 is first performed by the controller. Preconditioning processing provides a set of initial values utilized in a series of subsequent processes. The initial values comprise vehicle adjusted (baseline) speed, steering angle brake fluid pressure position and velocity of the extensible member of each suspension control unit. The preconditioning processing provides intermediate parameters that are used by all of the individual processes associated with controlling the wheels 702, 704, 706, 708, 710, 712, 714, 716. The preconditioning process is discussed in more detail with respect to FIG. 12.

Next, a set of various compression and rebound response mode processes comprising determination of the parameters of motion 702, 704, 706, 708, 710, 712, 714, 716 for each SCU are determined. The various compression and rebound responses modes are determined based upon the preconditioning calculations 724 provided as inputs to the various compression and rebound response mode processes. The response modes include an unsprung natural frequency response 704, a pumping down response 702, pitch 710 and roll 708 responses 710 and topping out and bottoming out response 706. A sprung natural frequency response 712 is derived from inputs supplied from the pitch and roll processes. The above mentioned response modes are discussed in detail with respect to FIGS. 13–22.

Figure 12:
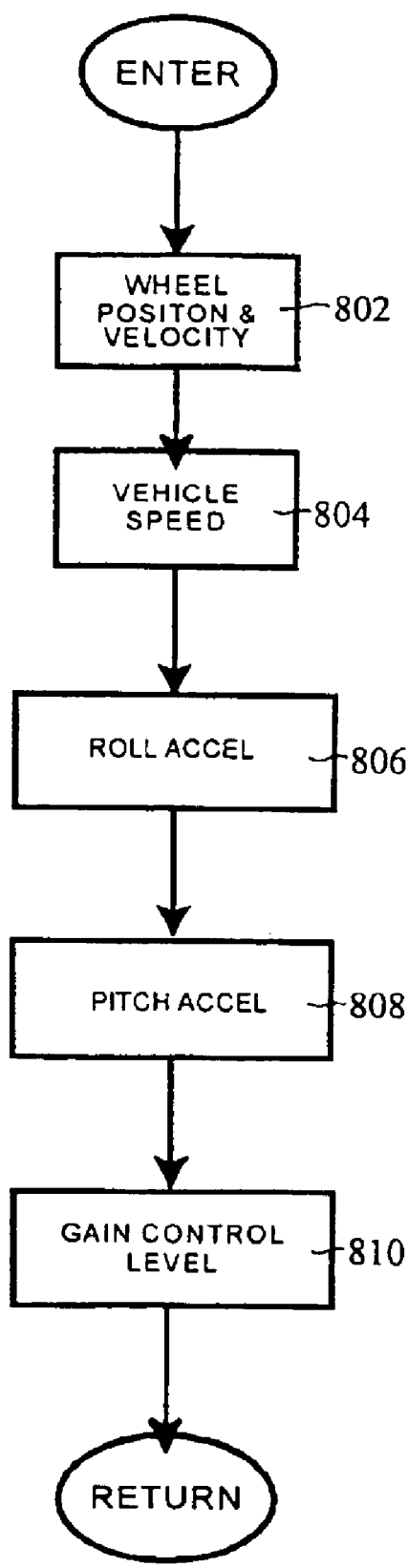
FIG. 12 is a flow diagram illustrating the processing sequence of the preconditioning process.

FIG. 12 is a flow diagram illustrating major steps of the preconditioning process. The parameters calculated are wheel position and velocity 802, vehicle speed 804, roll acceleration 806, pitch acceleration 808 and gain control level 810. This diagram shows the preconditioning calculations that provide intermediate parameters used by all individual wheel associated algorithms.

An average wheel position 802, or rest position is obtained by averaging position data outputted from the A/D converter over approximately 30 sec. Average wheel height in conjunction with temperature sensor data is used to calculate the absolute position of the wheels. When the car is making a turn the summing of values of integration are inhibited to prevent erroneous values from being used. The average of wheel height is subtracted from the sampled instantaneous value of wheel height to produce a normalized value.

Wheel velocity 802 is determined by subtracting the previous position from the current position then dividing by the time increment.

Vehicle speed 804 is integrated over several seconds so that a stable signal that does not require continuous updating is produced.

The roll 806 and pitch 808 accelerometer processes are performed identically. The first step is to determine if the roll accelerometer, data bus or computer has failed. If not, data is received from the A/D converter that collects pitch and roll data. If the accelerometer has failed, data from it is ignored. Next the roll accelerometer measured value is normalized. The normalization values for pitch and acceleration are the values that are obtained when the vehicle is sitting level at rest. This avoids difficulties related to uneven road surfaces. For example, if a car is traveling on a crowned road and is therefore leaning slightly the controller may determine that the car is going around a corner. A standard linear integrator known to those skilled in the art is used to determine the true roll accelerometer value by taking a long term value to subtract out the tilting effect of for example, a crowned road. With the standard linear integrator the long term roll accelerometer value would integrate to zero.

The final function is to clip small acceleration values. The comparison is made between the accelerometer data and the value stored in memory. If measured value is less than the predetermined value the accelerometer value is set to zero. This is so that the suspension does not act for small values of accelerometer measurement.

The roll accelerometer is filtered and normalized for position. Also integration is inhibited above 7° to accommodate crowned roads while also avoiding erroneous values during turns. Also clipping very small accelerations eliminates extraneous control signals being produced.

A gain control potentiometer 810 is utilized to control levels of SNF and roll/pitch. This process has the ability to completely turn off the compression part of the roll/pitch signal to control harshness of the ride.

Figure 13:
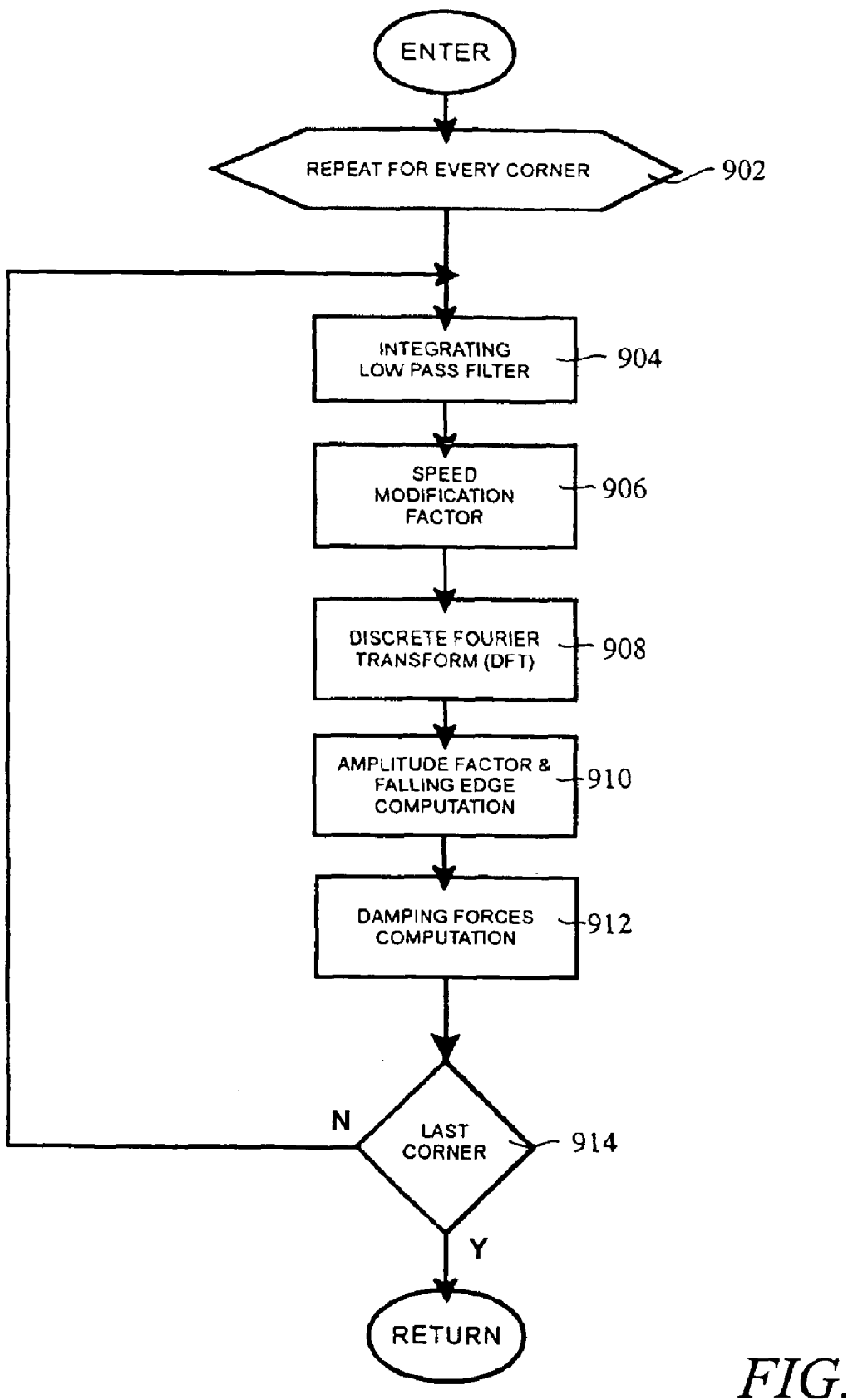
FIG. 13 is a flow diagram of the sprung natural frequency (SNF) process.

FIG. 13 is a flow diagram of the sprung natural frequency (SNF) process. It is desirable to eliminate an oscillation of the frame and body. A damping force is applied to reduce the oscillation. In the state-of-the-art damping is velocity dependent. In velocity damping a damping force produced is proportional to the velocity of the movement sought to be damped. Thus, force is proportional to the movement and not present until there is movement. In the embodiments of the invention SNF motion is advantageously reduced by the SNF process.

The process of FIG. 13 to control SNF motion is repeated at every wheel 902. Digital Signal Processing (DSP) is utilized to implement the operations described by a software based process. Wheel position is inputted to the process to determine a damping response. A normalized wheel position is filtered through an integrating LPF 904 to eliminate high frequency noise that occurs above the natural frequency of the wheel (UNF). Thus a filtered wheel position signal is produced, call LPF_AMP.

A Discrete Fourier Transform (DFT) 908 then determines the DFT amplitude of the filtered signal at the natural frequency (1 Hz). In other words, a 1" sine wave at 1 Hz yields a DFT output amplitude of 1", but a 1" sine wave at 10 Hz yields a DFT output amplitude of only about 0.15". This is partly how the control processes of this invention discriminate between SNF motions and UNF motions. Thus, the signals so far produced are A-LPF and the DFT amplitude of the SNF frequency component, called A_DFTSNF.

The DFT amplitude is further modified by a speed modification factor 906 that increases the control force signal as the vehicle goes faster. In addition, the signal is maintained at a minimum level below a certain speed, 30 miles. hour in the described embodiment. In a typical implementation, the speed factor is 1.0 at 60 MPH and reduces linearly to 0.5 at 30 MPH and is held there below 30 MPH and it would increase to 2.0 at 120 MPH. It should be appreciated that the selection of these values is at the discretion of the design engineers and the need of the particular vehicle. Thus A_LPF has been produced and a speed modified A_DFTSNF, called a A_DFTSNFSPEED.

An falling edge computation 910 is next performed on A_DFTSNFSPEED. The signal is processed by a falling edge integrator, called A_DFTSNFINT. The function of a falling edge integrator is half of a standard integration function. When a bump is hit, the A_DFTSNFSPEED increases, and then goes away. By using a falling edge integrator the signal is made to linger for a short period of time. After the bump has been hit the amplitude, and thus the damping force, can be kept up for a short while longer. As the chassis is damped over a couple cycles, the force remains for a short period of time.

Damping force calculations 912 are next performed. The calculations performed are to multiply a user adjustable gain times a square root of the product of A_LPF and A_DFTSNFINT. If A_LPF is positive (the wheel has been pushed up towards the chassis) then only a rebound force is applied to damp the motion as the chassis rises up. Likewise, if A_LPF is negative, only a compression force is used. It should be appreciated that the gains are different for each direction so the damping may be limited to rebound only by making the user gain 0 for compression. It should also be appreciated that the above process results in no forces if the vehicle is positioned as it should be (e.g., A_LPF is 0) and even if it is not and the wheel is displaced (e.g., A_LPF is not 0), if there is no SNF movement to damp (e.g. A_DFTSNFINT is 0) then there is still no damping. Taken together, the process only damps when it needs to and only the exact amount required.

Failure to take the square root results in a problem called "float". In smooth freeway driving not enough damping would be provided. When big bumps are hit, too much damping would be provided. Using the square root of the product minimizes these problems. For example, if the algorithm is tuned to handle 1 inch bumps, then when little bumps are encountered the suspension control is too soft. When a big bump are encountered, there would be too much damping. Thus, utilizing the square root of the product allows the system to compensate for an increased amount of adverse road conditions.

Figure 14:
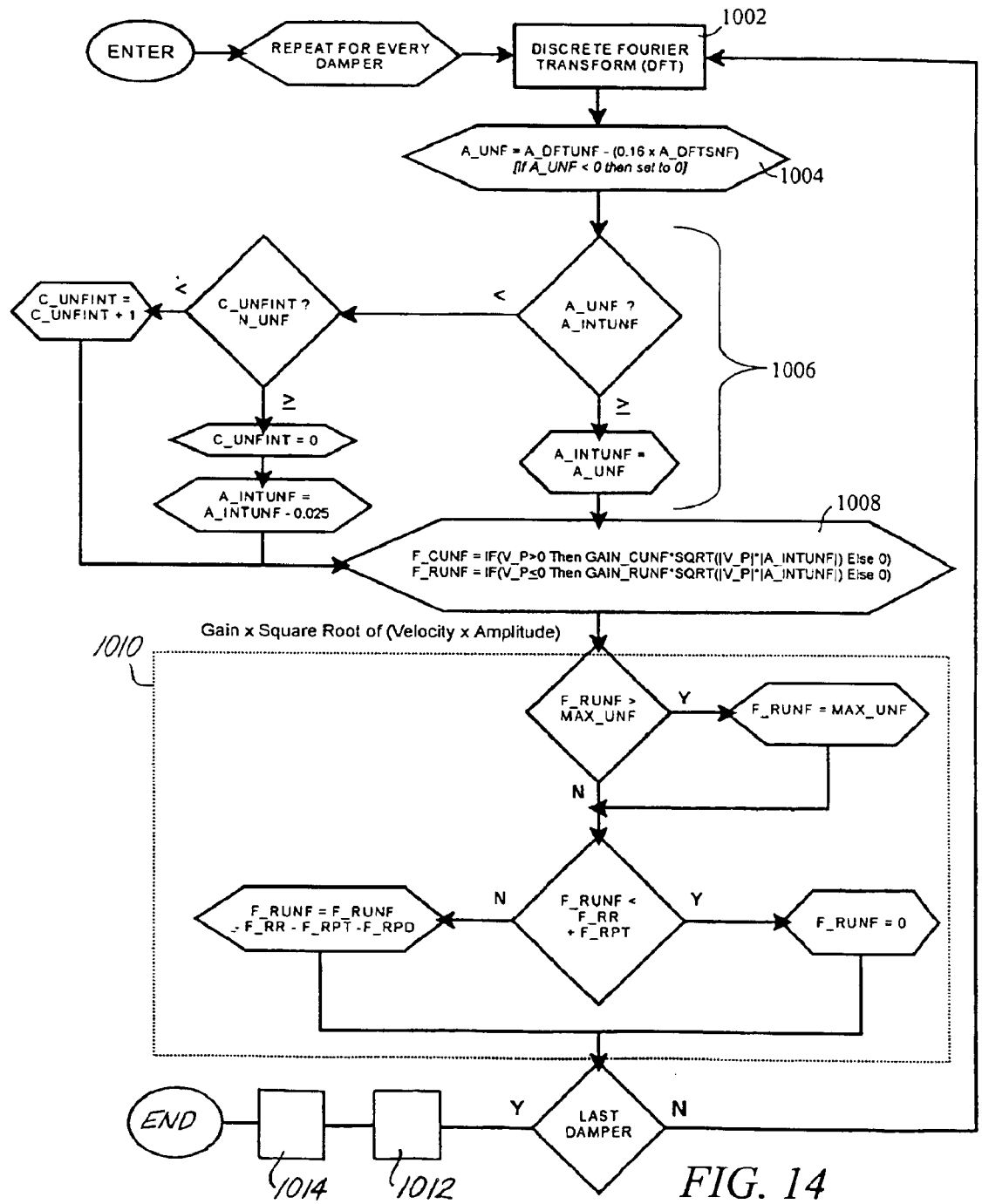
FIG. 14 is a flow diagram of the unsprung natural frequency (UNF) process.

FIG. 14 is a flow diagram of the unsprung natural frequency (UNF) process. This process is the counterpart to the SNF process, and is repeated at each wheel. The controller determines a damping force response to wheel movement at the unsprung natural frequency in a manner similar to that of the SNF response.

A DFT process, similar to that for SNF, is performed 1002 on the normalized wheel position to determine the amplitude of UNF motion, called A_DFTUNF. Typically the UNF (unsprung natural frequency) is 10–12 Hz. Note that in the UNF process the position data is not filtered. (This was done for the sprung natural frequency (SNF) response.) Filtering interferes with determination of the amplitude of the higher frequency unsprung motion. For example in an exemplary utility vehicle, the typical sprung natural frequency is on the order of 1 Hz, and the unsprung natural frequency is on the order of 10 Hz.

A correction to A_DFTUNF is next performed 1004. The UNF DFT filter is looking for motions around 10 Hz to determine the amount of UNF damping to apply. If there is a movement of only about 1 Hz (SNF frequency), then on UNF generated damping is desired, but the UNF DFT filter will still provide an output that is about 16% of the correct amplitude as seen by the SNF DFT filter. By subtracting 16% of the SNF DFT output (A_DFTSNF), the output of the UNFDFT is more accurate having had the "filter overlap response" removed. This corrected signal is called A_UNF.

Next A_UNF passes through a falling edge integrator 1006. This integrator performs a standard DSP integration function. The falling edge integrator was described in FIG. 13. This result in a modified signal A_INTUNF.

Next a set of forces to be applied is determined 1008. In this step instead of basing the force to be applied on wheel position, the force to be applied depends upon velocity. The goal in applying the forces based on the previously described SNF response (FIG. 13) is to maintain the chassis at a normal ride height. If the chassis goes above or below the normal ride height a compensating force is applied to correct the situation. In the present UNF process the motion of the axle is being damped. If the chassis is high or low when a fast bump is being hit, the 10 Hz damping to the axle works best if it is velocity dependent. Damping is typically applied on rebound only, but can be applied to compression as well. As mentioned before, the user gain for compression can be set to 0. The falling edge integrator keeps the output of the DFT at an acceptable higher level just as previously described for SNF. The forces are determined by multiplying a gain that is programmable by the user times the square root of the product of velocity and amplitude of motion A_INTUNF.

A force limiting process 1010 is next performed. Force applied is a function of velocity. If a large bump is hit more velocity will be generated. It is not desirable for a very large force to be applied when a large bump is encountered. Thus, the force applied when encountering large bumps is limited.

A subtraction of preexisting forces 1012 is next performed. If forces are already present from previously calculated processes, this process is designed not to add additional force. The previous forces are subtracted from the force determined in this process so that only an additional force needed is applied.

A DFT load compensation process 1014 is next determined. Here the determined forces are multiplied by a load compensation factor. Unlike the other processes this parameter relates to the axle and not loading on the chassis. Thus in the other processes the load compensation and increasing force is desired when the load increases. That is not the case here. Thus, in this stage to cancel out the load compensation the process divides the forces by the load factor so that when they are later multiplied by the same load factor, the compensation is canceled.

Figure 15:
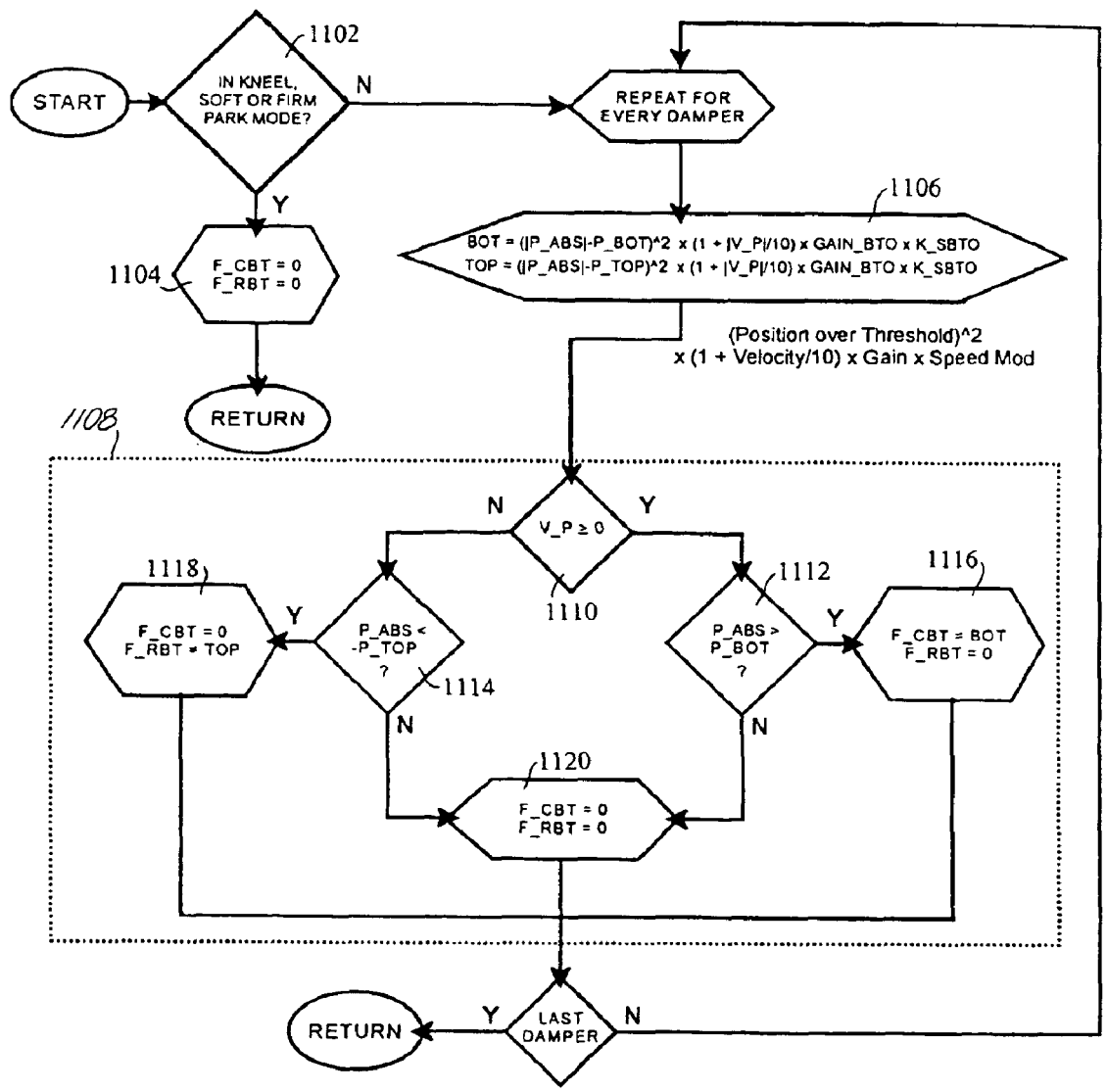
FIG. 15 is a flow diagram of the bottoming/topping out process.

FIG. 15 is a flow diagram of the bottoming/topping out process. A bottoming and topping out response is provided to resist the tendency of a vehicle to bottom or top out. The need to provide forces to counter bottoming and topping out is related both to the displacement of the suspension from its equilibrium position and the velocity with which the suspension is traveling farther away from that position. The control system of the present invention provides for the addition of preventative compression and rebound forces to respectively resist bottoming and topping out once a suspension SCU has traveled beyond a central zone, or window, approximately centered about the equilibrium position.

Initially a determination is made if the vehicle is in the kneel, or soft or firm park mode 1102. If in this mode the bottoming/topping out process is disabled 1104.

Next the amount of force is calculated 1106. It is the product of how fast the SCU is approaching and how close it is: (position over threshold)$^2$*(1+velocity/10)*gain* (speed mod). The factor "speed mod" is a user selectable setting that varies the force calculated to suit the user. The process next determines which way the wheel is headed 1110 and directs the next calculation based on this. This force is only applied when SCU position has passed a set threshold below which no force is required 1112, 1114. If position is above the appropriate threshold 1116,1118, to provide the correct forces in the correct directions to prevent bottoming or topping out. If the position is below the appropriate threshold the forces are set to zero 1120.

Figure 16:
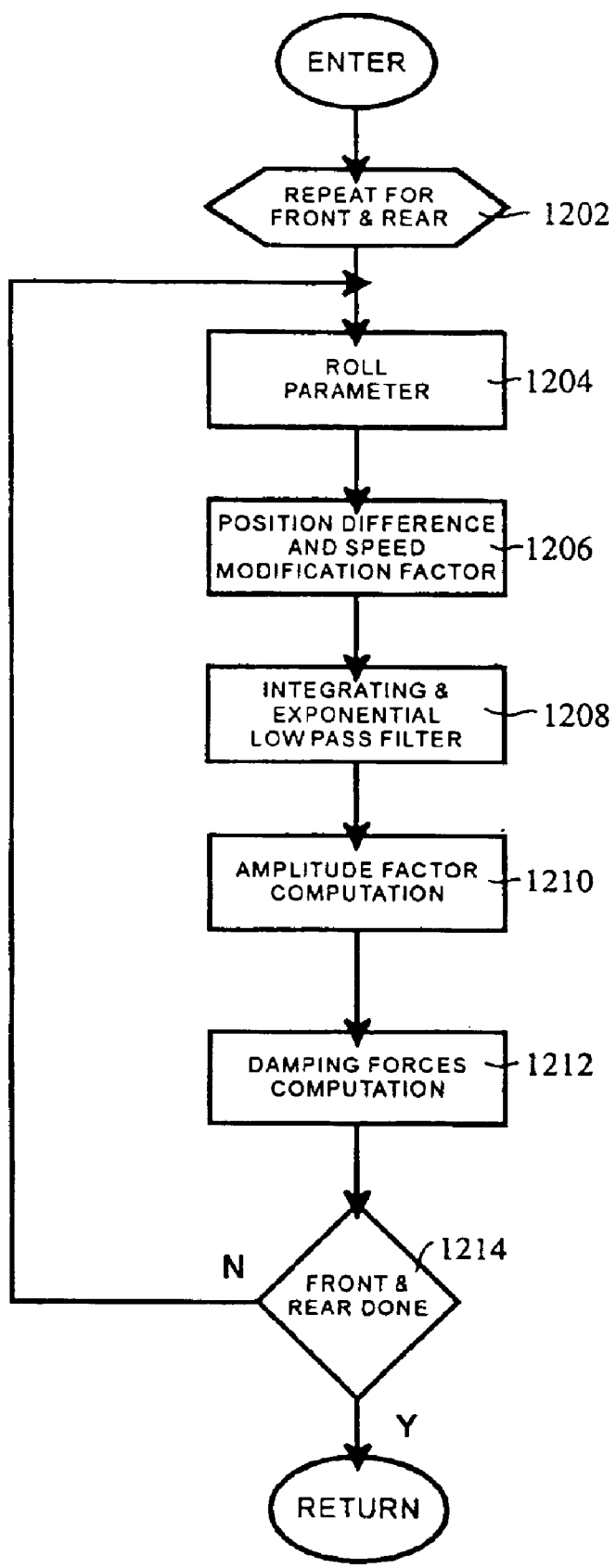
FIG. 16 is a flow diagram of the roll computation process.

FIG. 16 is a flow diagram of the roll computation process. Use of this process allows removal of the sway bar typically present on a vehicle. This process is applied interactively to the front and rear of the vehicle 1202. In implementing the process in the front and back of the vehicle different constants are applied. The process described here is also the same as the pitch process, but again with different constants being applied.

This process consists of the iterative determination of the roll parameter 1204, determination of the position difference 1206, integrating and expansion low pass filtering 1208, amplitude factor computation 1210, and damping forces computation 1212. The processes described above are performed until a determination is made that the processes for the front and rear of the vehicle are done 1214.

Forces resulting from this process are determined whenever the vehicle encounters a maneuver which causes roll or pitch, such as, cornering or braking. Counteracting forces are applied proportional to the amount of influence being applied to the vehicle, such as, the product of vehicle speed and turn angle. In addition, if any motion still occurs (indicating there is incorrect force), then additional corrective forces are applied or removed in a stabilized feedback manner.

The roll parameter process 1204 determines the intermediate parameter ROLL from accelerometer input. ROLL indicates the degree of turn which is proportional to the degree of anti-roll force that is required. Compression and rebound forces are also calculated that are directly proportional to acceleration. Next a different signal between left and right is calculated.

The position difference process 1206 determines a position difference between the left and right sides of the vehicle. First a standard integration function is applied to obtain an average position. This number represents the body roll more accurately. The ROLL parameter indicates a need for anti-roll forces described above but there is no feedback loop to indicate if it is enough, if the vehicle has rolled over a lot or a little, etc. By using the position sensors to compute the difference between the sides, an indication of the actual roll can be determined.

This value is time filtered and small amplitude filtered to reduce harshness just as for the other processes above. This difference is then used to add or subtract anti-roll forces to compensate if the vehicle is rolling the wrong way or rolling too much, respectively.

Next an integration and expansion low pass filtering process is performed 1208. If the roll is below a certain value it is set to zero. Next if the roll is above a certain value that value is used. This value is not applied instantaneously. It is applied in an incremental fashion until the final value is reached. A linear filter allows this force to be applied gradually.

When a vehicle goes around a corner an accelerometer and portion sensor tells the control system that the vehicle is rolling. Since the position sensor provides input concerning roll its output is examined here. If the vehicle tilts in one direction when cornering, force is added in one direction. If the vehicle tilts in the other direction, force is subtracted. The amplitude factor computation process 1210 and the damping forces computation 1212 are next computed as detailed in FIG. 13.

Figure 17:
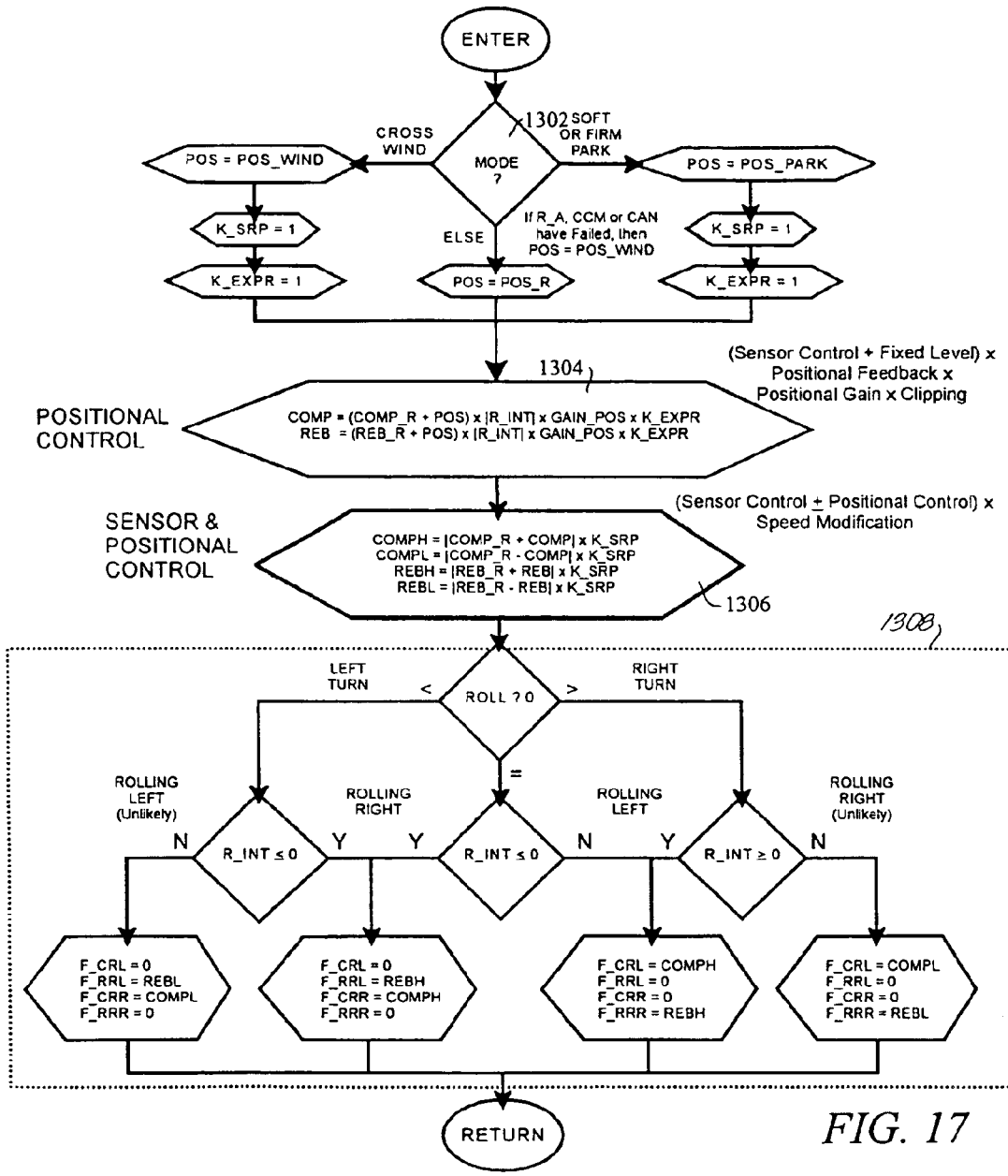
FIG. 17 is a flow diagram of the roll force computation process.

FIG. 17 is a flow diagram of the amplitude factor computation/damping forces computation processes of the roll computation process. First the process determines if the vehicle is in the cross wind or soft/firm mode 1302. If in the soft or firm park modes, the expansion filter constant is set to 1. If not in the soft or firm park modes the position is set to the non sensor position roll control value. Next the positional control is calculated 1304 followed by sensor and positional control 1306. Next the damping forces are applied to the appropriate wheels 1308.

Figure 18:
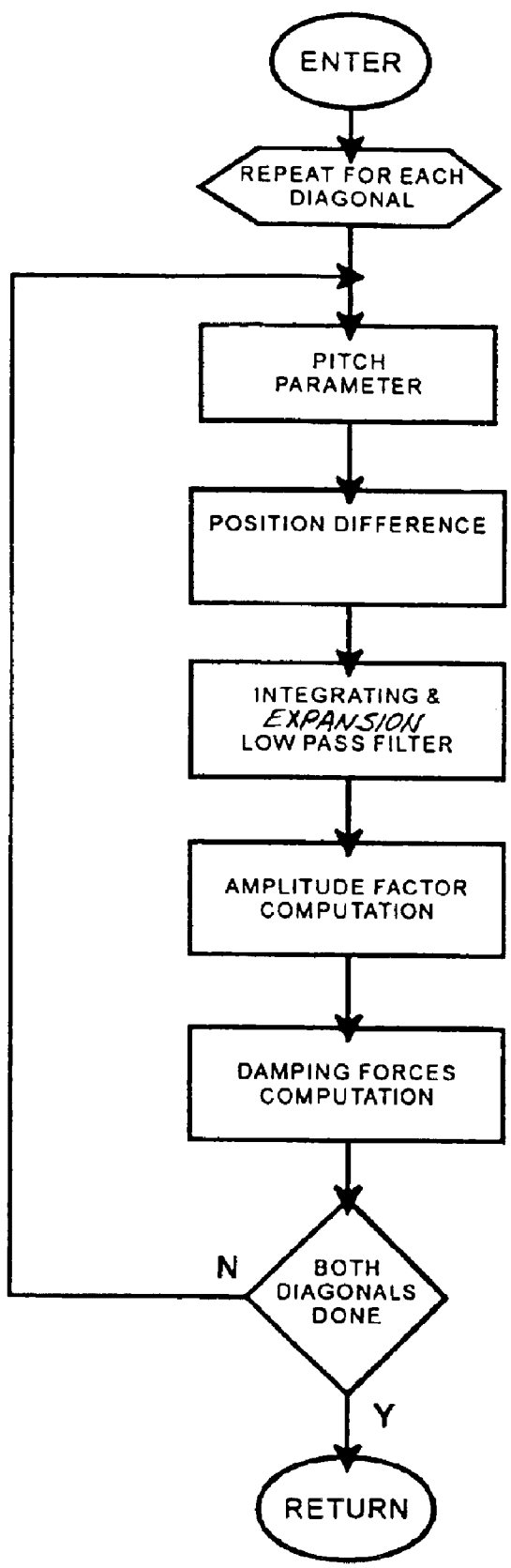
FIG. 18 is a flow diagram of the pitch computation process.

FIG. 18 is a flow diagram of the pitch computation process. The pitch response is determined in the same way as roll. In general, the integrated roll variable is replaced with an integrated pitch variable, which utilizes front and rear oppositely placed wheels for extensible member positions, that is, right front and right rear wheels instead of right front and left front wheels. Performing the substitutions as described above results in the pitch responses desired compression and rebound values.

The roll response is calculated in terms of separately calculating left and right responses for the front and rear of the vehicle, the pitch response is calculated by separately calculating front and back responses for the left and right sides of the vehicle. The other responses are typically computed serially for each of the four wheels.

Figure 19:
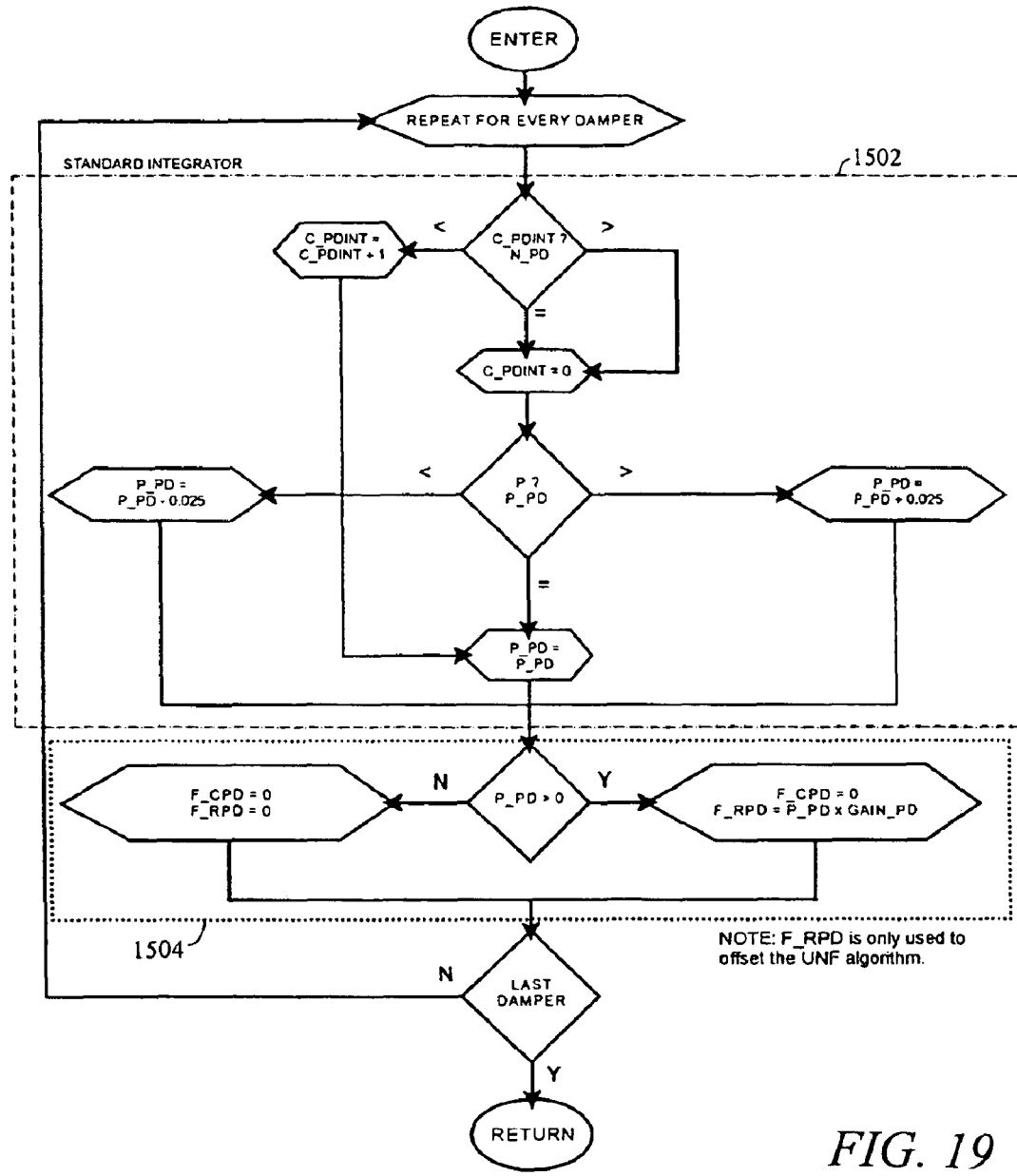
FIG. 19 is a flow diagram of the pumping down (PD) process.

FIG. 19 is a flow diagram of the pumping down (PD) process. Pumping down control is added to the system response to provide for proper system operation. It prohibits introducing imbalanced forces, due to the unsprung frequency response into the system. Pumping down control is a monitoring process that can detect if the UNF process is unacceptably pulling the vehicle down. For example the process is used when many fast bumps are being encountered and the larger rebound control forces are pulling the vehicle down. This will detect the vehicle being pulled down and reduce the forces to allow the suspension to travel back up, within the desired range of motion.

A standard integrator 1502 performs this function of tracking the position. If it detects a lowering of the chassis the UNF forces are lessened 1504, causing the chassis to rise.

Figure 20:
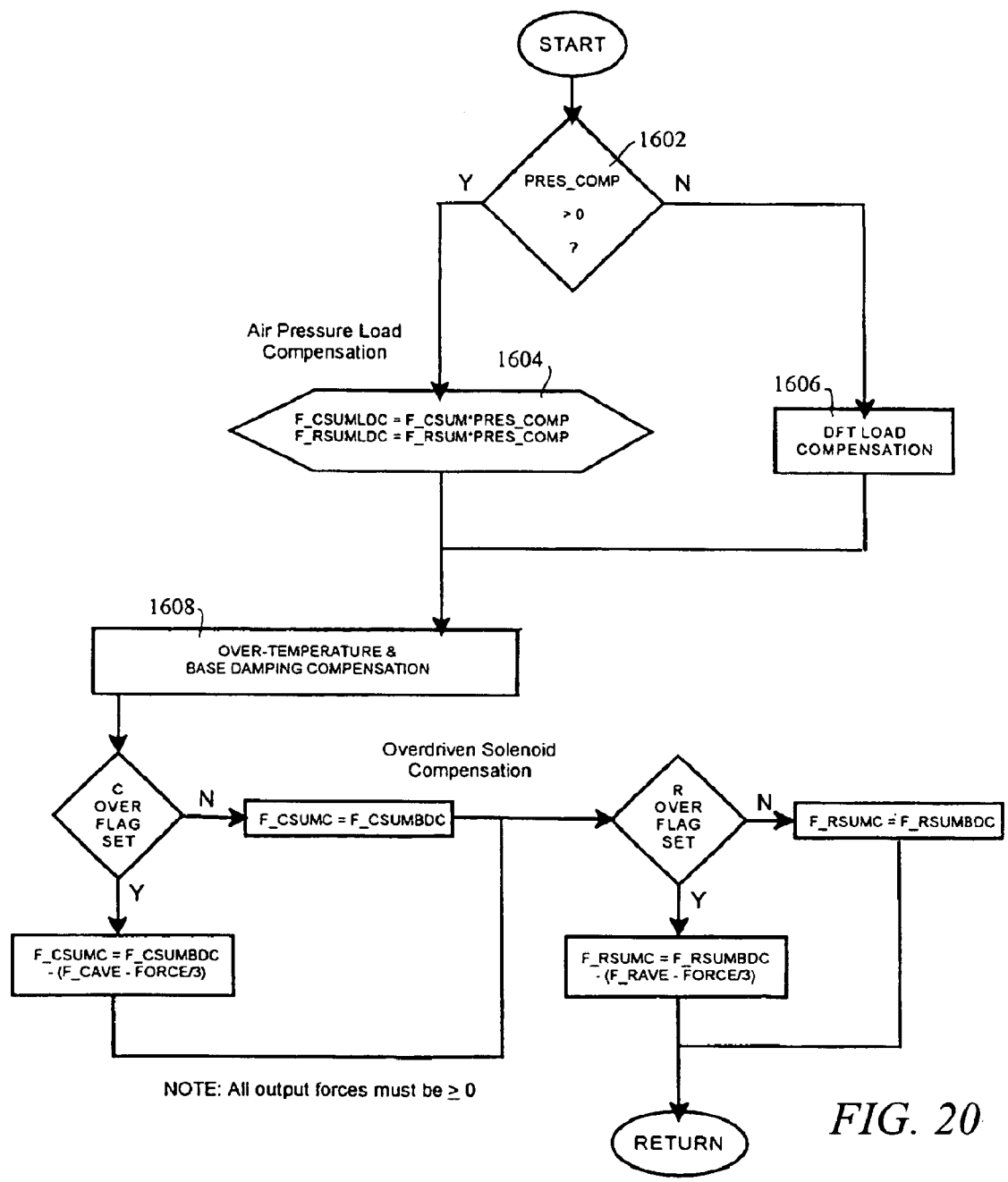
FIG. 20 is a flow diagram of the compensation process.

FIG. 20 is a flow diagram of the compensation process. When a vehicle is loaded with additional weight, there is a need for proportionally higher control forces. The compensation process provides the correct load adjustments.

First a determination is made to determine if fixed or air springs are present 1602. If air springs are present the appropriate compensation forces are calculated 1604. For fixed springs a DFT load compensation process is employed 1606.

In a fixed spring suspension DFT filtering 1606 indicates a load change by comparing a filter detecting the natural frequency with that of a filter that detects half of the natural frequency. As the vehicle is loaded its natural frequency decreases and the filters react to this difference.

DFT filtering 1606 is used in fixed spring suspensions to indicate a load change by comparing SNF outputs of a filter that detects the SNF natural frequency with that of a filter that detects ½ the natural frequency. As the vehicle is loaded down, its SNF natural frequency decreases & the filters reflect that difference (their ratio is very nearly proportional to the load change).

For air suspension systems, the increase in air spring pressure is used to indicate a load change by adding weight.

Base damping compensation 1608 is provided to reduce the computed force by the amount of force that is generated by high speed flow through the valve An over-temperature compensation process gradually reduces the control forces to keep the temperature under the rated 250° F.

Figure 1:
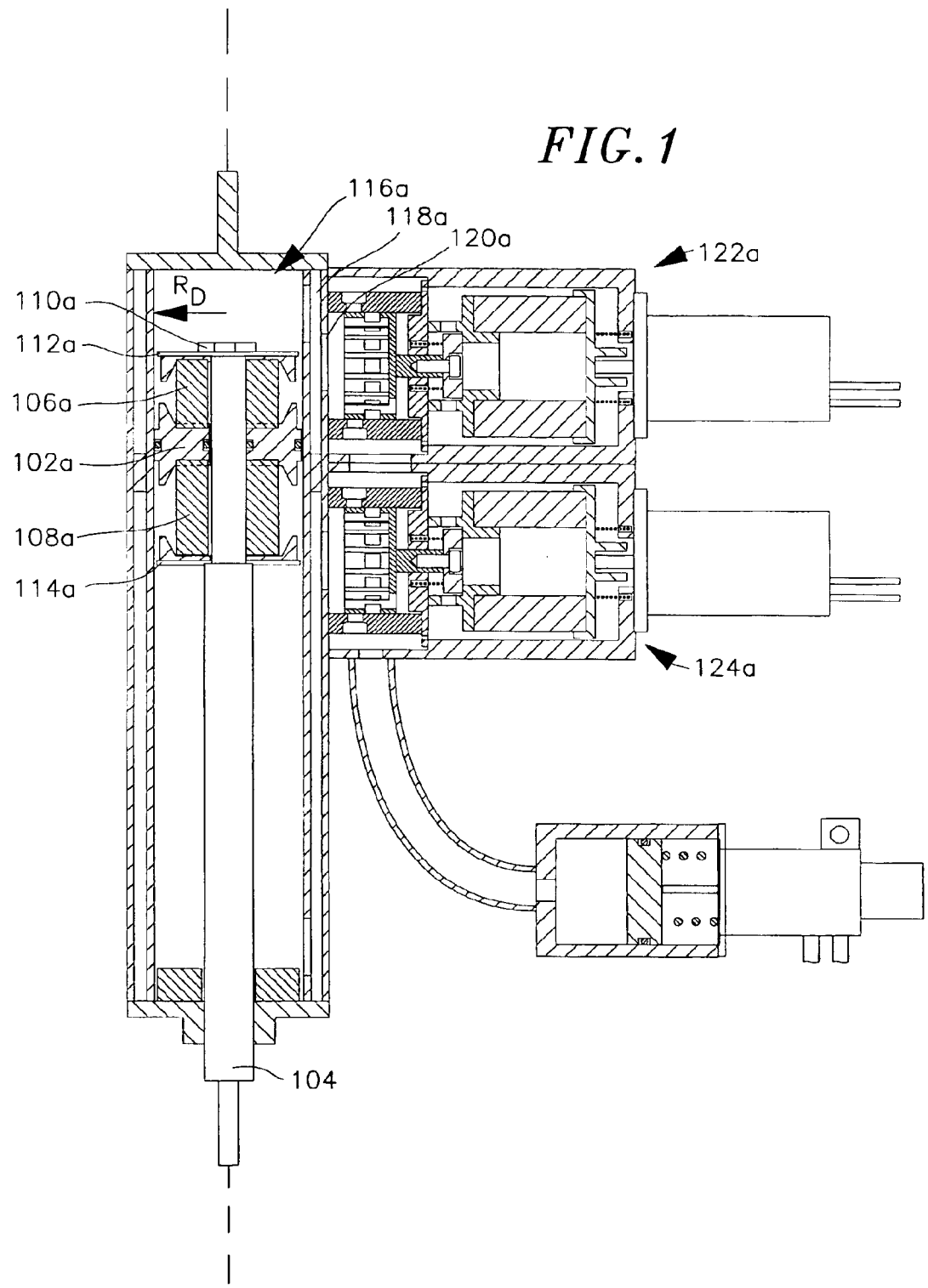
FIG. 1 is a cross sectional view of a damper showing how mechanical compliance could be provided.
Figure 21:
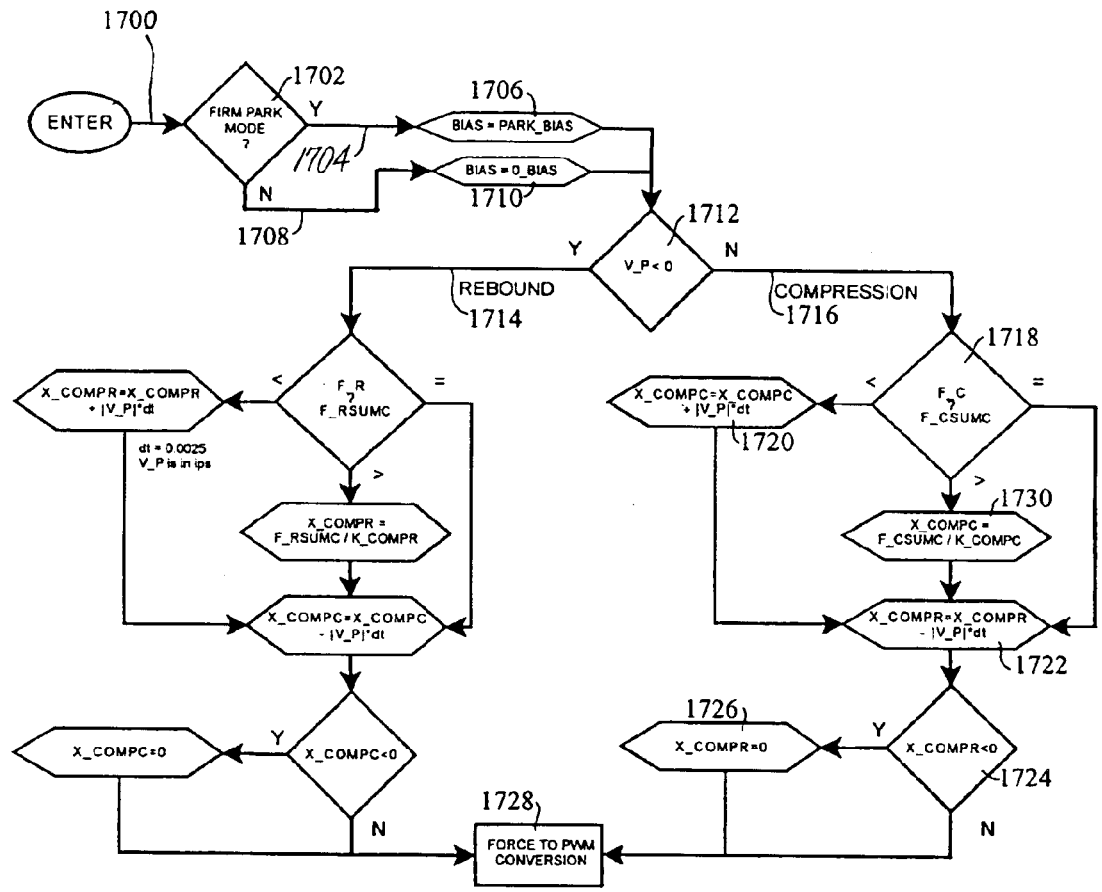
FIG. 21 is a flow diagram of the compliance emulation process. Like reference numerals are used to designate like parts in the accompanying drawings.

FIG. 21 is a flow diagram of the compliance emulation process. As described in FIG. 1, placing a spring inside the actuator is a means of providing mechanical compliance. It is desirable to eliminate a mechanical spring and replace it by another means of supplying compliance. A hydraulic accumulator under computer control is capable of exerting compliance forces on the compression and rebound similar to a spring. This is done by using a hydraulic pressure supplied by a fluid from a reservoir to provide compliance. Reservoirs to supply compliance however, are large and costly thus, it is desirable to provide an emulated mechanical compliance that does not require a large reservoir. The embodiment emulates mechanical compliance by controlling the SCU solenoids. Controlling the solenoids provides a means of controlling the hydraulic pressure exerted on the fluid. Computer emulation of compliance or "integrated compliance" reduces any need for springs and other mechanical parts.

An accumulator provides smoother transitions between compression and rebound forces. Hardware compliance force (measured in pounds/in) is provided in the embodiments by a software emulation. The software emulation controls forces applied by a hydraulic system.

A mechanical accumulator is a device, such as a spring, that when fully compressed possesses a stored potential energy with zero kinetic energy. When the spring is released it expands to a fully extended position having zero potential energy and a maximum of kinetic energy. After full expansion the spring contracts exerting a force equal in magnitude to the expansion bent in the opposite direction. With a hydraulic accumulator a stored energy is available as in a mechanical accumulator. Stored energy is available when a software program successfully emulates the process of compression and expansion of the spring by controlling pressure on a hydraulic fluid. The emulation recreates a desired spring characteristic. When force is applied to compress a simulated accumulator, the stored force later returns during an accumulators expansion. In a software emulation of a mechanical accumulator a force applied by a SCU is modulated by a wheel's position:

$$\text{Force}_{Rise/Fall} = K(\text{wheel position})$$

Where wheel position is the displacement of the wheel,
K is a simulated spring constant, and
$\text{Force}_{Rise/Fall}$ is a force applied by the hydraulic actuator.

For example, when a bump is hit by a wheel the computer control system allows the pressure in the reservoir to increase in a monotonically increasing fashion by controlling the fluid pressure with a regulator. A curve plotting force over time is reproduced as if an actual accumulator were present. Once the direction of travel of the wheel reverses the energy stored in the accumulator is returned to the mechanical system by controlling a second regulator that regulates a second fluid body being pressurized in the appropriate direction of travel.

A factor in providing sufficient performance in such an electronically simulated accumulator is valve response speed. Control signal input are provided every 2.5 ms in an embodiment of the invention. Thus, the solenoids and valves controlled by them are required to respond in 2.5 ms to a change in control signal input to them. A specially modified poppet valve is used to achieve this response in an embodiment of the invention.

A LVIT piston in the REM moves and using its displacement as the equivalent of the compression of a simulated spring the force rises to the preset relief as if there was compliance. When the piston changes directions, however, there is no stored energy in the fluid once a comprehensive force is removed, so the force drops instantly to 0 and the simulated spring must then be set back to 0 by integration for the next stroke. The wheel position is multiplied by the predetermined simulated spring constant that produces proper operation.

A reduction in size of the hydraulic actuator is possible because a force is only applied as a wheel rises. Force is not applied as the wheel falls, thus requiring no energy storage by the accumulator. The effect produced is an improvement in a suspension system's performance. This is because a larger adjustable force is available, leak down that occurs when cornering on smooth roads tends to be reduced and improvements in the harshness of a ride frequency spectrum generated when hitting bumps tends to be produced.

Physical compliance is thus emulated based upon the computer calculation of the displacement of a LVIT piston. This displacement is treated as the equivalent of the compression of the mechanical spring. For example, in emulating in a compression direction as the piston is pushed upward. The force in a compression reservoir rises to a preset pressure value as if mechanical compliance was provided between the coupling of the SCU shaft and the piston.

Since physical compliance is large and expensive, it is simulated by a computer by measuring displacement as the LVIT piston moves and using the LVIT displacement as an equivalent to a spring displacement so that as the pressure on the fluid rises to the preset blow-off compliance forces are provided. When the LVIT piston changes directions, however, there is no stored energy to exert in the opposite direction so the compliance force drops instantly to 0, requiring the simulated spring force to be integrated back to 0 for the next stroke. The simulated spring position is multiplied by a predetermined equivalent spring rate that allows proper operation.

FIG. 21 is a flow diagram of a process for emulating compliance. The signal presented for compliance processing 1700 represents a composite set of compression and rebound forces (714 of FIG. 11) that have been processed by a load compensation process (714 of FIG. 11). A set of initially zeroed variables are modified by the process. In implementing the compliance process shown in FIG. 17 it is first determined whether or not the vehicle is in the firm park mode 1702. If the vehicle is in the firm park mode 1704 a bias is applied 1706 to lock the regulators into position preventing the vehicle from moving. In an alternative embodiment a SCU may be used with an air spring system to achieve leveling in a motor home. The air spring suspension system is described in more detail in co-pending U.S. patent application entitled "Enhanced Computer Optimized Adaptive Air Spring Suspension" filed Nov. 11, 1999, U.S. patent application Ser. No. 09/439,106. The disclosure thereof is incorporated herein in its entirety by reference thereto. Motor homes typically use a system of hydraulic rams in addition to their suspension system to level and stabilize the motor home when it is parked. In this alternative embodiment the air springs are used to level the motor home and the suspension control unit then locks the suspension in place. By using the suspension control unit to lock the suspension in place the floor is leveled without allowing bouncing created by the occupants moving about.

Further, the suspension may be locked into position when parked by applying a constant locking force at all of the solenoid controlled valves in the regulators. When used in conjunction with an air spring the vehicle is leveled and then locked into position by applying the locking force at the valves. If the vehicle is not in the firm park mode 1708 the bias supplied to the regulators is set to zero 1710.

Next, a decision is made 1712, based upon a current SCU LVIT piston velocity. A positive velocity value indicates that a wheel is moving upwards towards the vehicle, a negative value indicates that it is moving away. If the SCU LVIT piston velocity is less than zero control branches to a rebound process 1714. If the SCU LVIT piston velocity is greater than or equal to zero control branches to a compression process 1716.

In a compression branch 1716 a decision is made 1718 as to whether the calculated compression force is less than, greater than, or equal to a composite set of the sum of compression forces modified by a load compensation factor. The forces compared in block 17/18 are F_C and F_CSUMC. The signal F_CSUMC FC sum C is a compression force that has undergone a compensation process. Initially FC is set to 0 as an initial condition. Thus initially, FC sum C is greater than FC. If the initial compression force is less than the composite force the process branches to the left where a spring simulation process emulating compliance is encountered 1720. In this block a position of a simulated spring is computed. The position is computed by adding to the present position an incremented distance traveled by the LVIT shaft computed by multiplying the shaft velocity by a time interval. In an embodiment, the time interval is a fixed 2.5 ms. Initially the signal simulating the spring. A variable representing spring position X_COMPC is initially 0 its value is equal to the initials that were previous iteration value of its self plus an increment in distance given by the LVIT piston velocity times the time interval.

Process step 1722 represents the position of a rebound spring. The rebound spring position is denoted X_COMPR. Its value is equal to its initially assigned 0 value or the previous iteration value minus a link equal to the velocity times the time interval. Blocks 1720 and 1722 are representative of a compression spring being loaded and rebound spring being unloaded. Conceptually this is equivalent to a first and second fluid pressure being exerted on each side of a piston, as the pressure on one side of the piston is increased, it is decreased on the opposite side. Blocks 1720 and 1722 thus simulate a hydraulic accumulator. In a hydraulic accumulator one side of a piston is biased with a spring force. An opposite side of the piston with the cylinder walls forms a reservoir that a hydraulic oil is pumped in to.

When valves are opened or closed the spring in the accumulator provides a force for the fluid to act against when valves in a hydraulic circuit are opened or closed preventing knocking in the system that would be caused by the fluid pressure being gated by a valve in the hydraulic circuit. The force exerted by the fluid pressure is stored in the accumulator for later application. In an embodiment the solenoid controlled valves are opened and closed slowly to simulate the effect of having a hydraulic accumulator present in the system. This is a simulation of the accumulator. As the piston moves its position is integrated through the continual addition of its velocity and distance traveled. In the compression direction the force continues to build up until the piston velocity reaches zero.

After the compression and rebound distances are calculated in blocks 1720 and 1722 respectively, the value obtained for X_COMPR is compared to 0. If X_COMPR is less than 0 the process branches to block 1726 where X_COMPR is set equal to 0. The signal is next routed to a process that performs a force to PWM conversion 1728. Returning to process step 1724 if X_COMPR is a positive value the signal is routed directly to block 1728.

Figure 22:
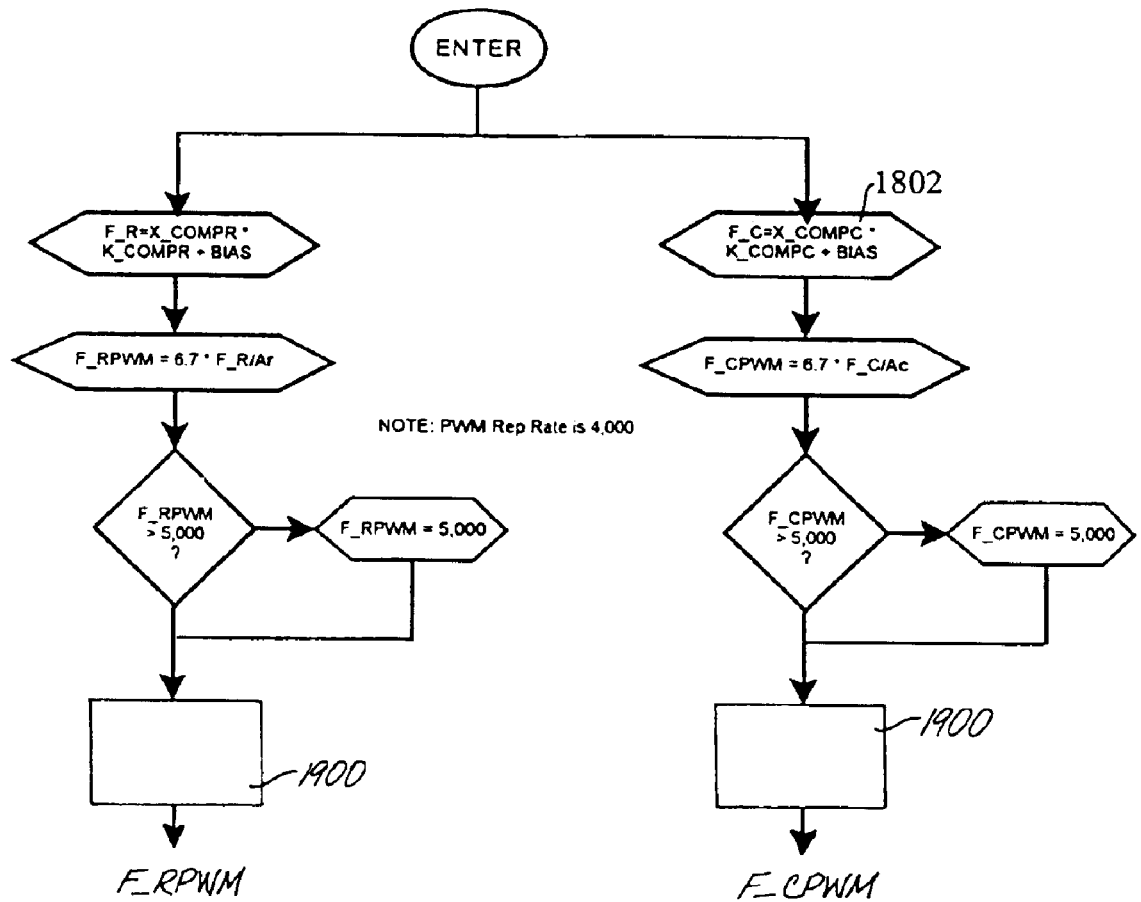
FIGS. 22 and 23 are a flow diagram of the solenoid response time boost process.
Figure 23:
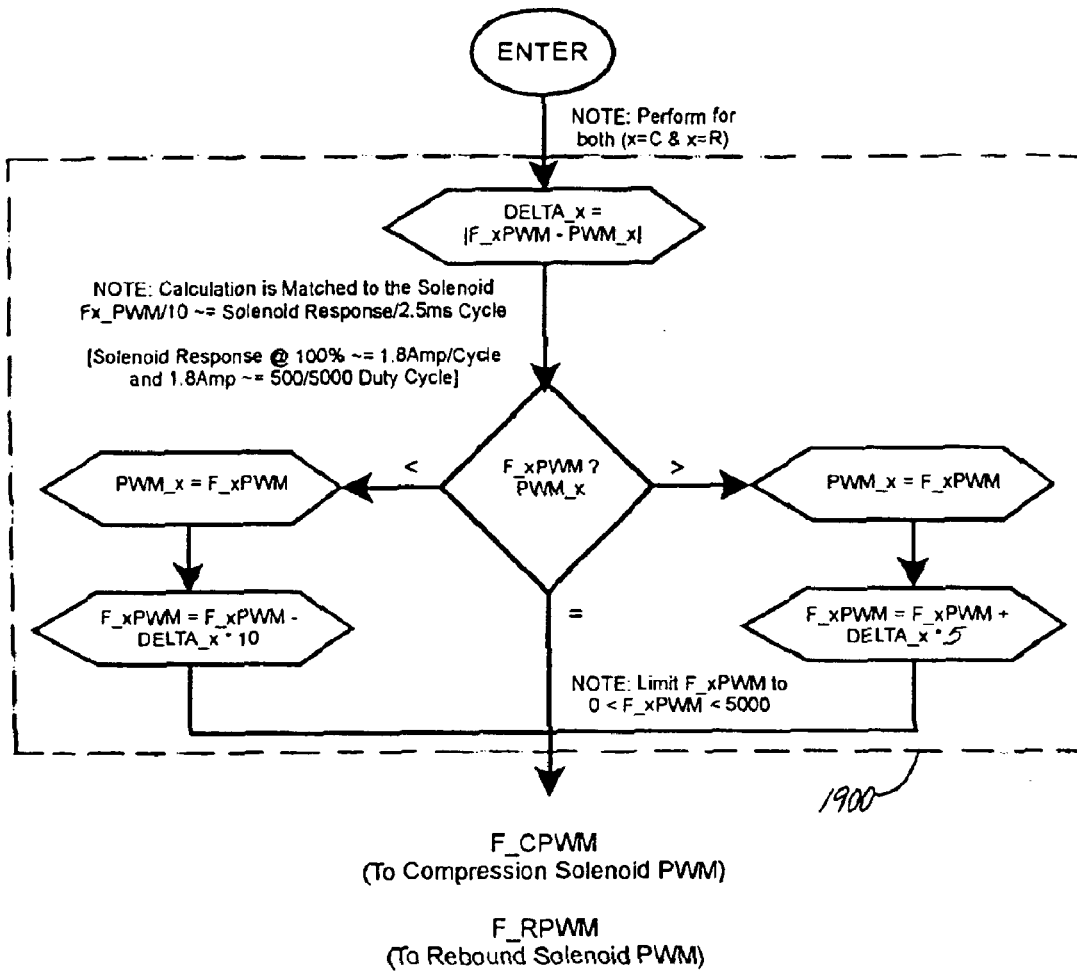

FIG. 22 is a flow diagram of the solenoid response time boost process. The solenoids that control the suspension unit valves are preferably controlled by Pulse Width Modulation (PWM), which is well understood in the art. The PWM approach has the inherent weakness in that it results in a slow solenoid response. The problem is that the PWM output does not provide full voltage or ground continuously, which is required to get the speed out of a solenoid (e.g., 50% duty cycle provides voltage only 50% of the time, so the rise/fall time is ½ that of full voltage/ground). FIG. 22 describes a novel solution to the solenoid problem. The solution is to calculate the change in duty cycle from cycle to cycle and increase/decrease ("boost") the PWM output to force the correct increase/decrease in solenoid current for that cycle. The amount of boost is determined experimentally so as to force the desired change in current during the delay time between PWM updates. For example, if the PWM duty cycle has increased by 5%, the actual output duty cycle would typically be increased by 25% (5×5%), which would result in a current increase in the solenoid of 5% as desired.

What is claimed is:

1. A control system for controlling the damping response of a vehicle suspension system comprising:
   a suspension control unit having an integral wheel position sensing device to determine the position of a wheel and a damper for applying a force on the wheel; and
   a distributed controller architecture for calculating the damping force to be applied to the vehicle suspension system by the damper based upon the wheel position determined by the wheel position sensing device, wherein the distributed controller architecture determines simulated compression and rebound forces of a simulated accumulator required to provide mechanical compliance as a function of the position of the wheel and adjusts the compression and rebound forces applied by the damper to emulate mechanical compliance of the simulated accumulator.

2. The control system of claim 1 wherein the distributed controller architecture provides software emulation of mechanical compliance of a hydraulic accumulator.

3. The control system of claim 1 in which the distributed controller comprises a central processing unit with individual controllers for each wheel operating under the direction of the central processing unit.

4. The control system of claim 1, wherein the distribution controller architecture provides emulation of mechanical compliance by application of control signals to the damper.

5. The control system of claim 1 in which the suspension control unit's damper shaft is lockable in position.

6. The control system of claim 1 further comprising one or more sensor for generating one or more parameters of motion and wherein the distributed controller architecture comprises means for preconditioning the one or more parameters of motion and wherein the distributed controller architecture calculates the damping force to be applied to the vehicle suspension system by the damper based upon the wheel position determined by the wheel position sensing device and the one or more preconditioned parameters of motion.

7. The control system of claim 1 wherein the distributed controller architecture comprises means for determining vehicle loading as a function of spring natural frequency of the vehicle suspension and means for modifying the damping force to be applied to the vehicle suspension system to compensate for variations in vehicle loading.

8. The control system of claim 1 wherein the wheel position sensing device determines direction of travel of wheel and wherein the distributed controller architecture adjusts the compression and rebound forces applied by the damper to emulate mechanical compliance of the simulated accumulator as a function of direction of travel of the wheel.

9. The control system of claim 1 wherein the simulated accumulator is a simulated energy storing accumulator.

10. A control system for controlling the damping response of a vehicle suspension system comprising:
    a suspension control unit having an integral wheel position sensing device to determine the position of a wheel and a damper capable of applying a force on the wheel; end
    a distributed controller architecture for calculating the damping force to be applied to the vehicle suspension system by the damper based upon the wheel position determined by the wheel position sensing device, wherein the suspension control unit's position sensing device comprises a temperature sensor for determining absolute wheel position, wherein the distributed controller architecture determines simulated compression and rebound forces to provide mechanical compliance in response to adjust the compression and rebound forces applied by the damper.

11. A method for controlling the damping response of a vehicle suspension comprising:
    determining velocity of a damper shaft coupled to a wheel;
    determining compression and rebound forces to be applied to the wheel based upon parameters of motion;
    determining simulated compression and rebound forces of a simulated accumulator required to provide mechanical compliance; and
    modifying the compression and rebound forces applied to the wheel to emulate the mechanical compliance of the simulated accumulator in accordance with the simulated compression and rebound forces.

12. The method of claim 11 wherein the simulated accumulator comprises a simulated mechanical accumulator.

13. The method of claim 11 wherein the simulated accumulator comprises a simulated hydraulic accumulator.

14. The method of claim 11 further comprising preconditioning the plurality of parameters of motion.

15. The method of claim 11 further comprising determining vehicle loading as a function of spring natural frequency of the vehicle suspension and modifying the compression and rebound forces to provide compensation for variations of vehicle loading.

16. The method of claim 11 wherein determining velocity of a damper shaft coupled to a wheel comprises determining direction of travel of the damper shaft and wherein determining simulated compression and rebound forces of a simulated accumulator required to provide mechanical compliance comprises determining simulated compression and rebound forces of a simulated accumulator required to provide mechanical compliance as a function of direction of travel of the damper shaft.

17. The method of claim 11 wherein determining simulated compression and rebound forces of a simulated accumulator required to provide mechanical compliance comprises comparing a calculated compression force to a composite set of compression forces and determining compression force of a simulated accumulator required to provide mechanical compliance as a function of said comparison.

18. The method of claim 17 wherein determining compression force of a simulated accumulator required to provide mechanical compliance as a function of said comparison comprises determining a position of a simulated spring when the calculated compression force is less than the composite set of compression forces.

19. The control system of claim 11 wherein the simulated accumulator is a simulated energy storing accumulator.

20. A method for controlling the damping response of a vehicle suspension comprising:
   determining compression and rebound forces to be applied to a wheel based upon parameters of motion;
   determining vehicle loading as a function of spring natural frequency of the vehicle suspension by determining vehicle loading as a function of a ratio of spring natural frequency and one half the spring natural frequency of the suspension; and
   modifying the compression and rebound forces to provide compensation for variation of vehicle loading.

21. A method for controlling the damping response of a vehicle suspension comprising:
   determining compression and rebound forces to be applied to a wheel based upon parameters of motion;
   determining vehicle loading as a function of spring natural frequency of the vehicle suspension;
   modifying the compression and rebound forces to provide compensation for variation of vehicle loading;
   simulating compression and rebound forces of a simulated accumulator required to provide mechanical compliance as a function of the parameters of motion; and
   modifying the compression and rebound forces applied to the wheel to emulate the mechanical compliance of the simulated accumulator.

* * * * *